United States Patent [19]
Yoshizawa

[11] Patent Number: 5,557,726
[45] Date of Patent: Sep. 17, 1996

[54] METHOD AND APPARATUS FOR A REMOTE GROUPWARE OPERATING SYSTEM

[75] Inventor: Kenichi Yoshizawa, Kamakura, Japan

[73] Assignee: Mitsubishi Denki Kabushiki Kaisha, Tokyo, Japan

[21] Appl. No.: 84,568

[22] Filed: Jun. 29, 1993

[30] Foreign Application Priority Data

Jan. 28, 1993 [JP] Japan ................................ 5-012392

[51] Int. Cl.⁶ .......................................... G06F 3/14
[52] U.S. Cl. ...................... 395/153; 364/DIG. 1; 364/DIG. 2; 364/222.2; 364/919
[58] Field of Search ................. 364/DIG. 1 MS File, 364/DIG. 2 MS File; 395/200, 100, 154, 153, 155, 200.01, 200.02, 200.04, 200.09; 379/201, 202, 203, 204, 205, 206

[56] References Cited

PUBLICATIONS

Laurence R. Brothers "Multimedia Groupware For Code Inspection" IEEE 1992 pp. 1076–1081.
William J. Clark "Multipoint Multimedia Conferencing" IEEE, May 1992 IEEE pp. 44–50.
1992 IEEE "Distributed Cooperative Control for Sharing Applications Based on Multiparty . . . Desktop Conferencing System" Jun. 9, 1992.
1990 IEEE "The Implications of Window Sharing for a Virtual Terminal Protocol" John F. Patterson.
"A Comparison of Application Sharing Mechanisms in Real–Time Desktop Conferencing Systems" AT&T Bell Labs.
Communications of the ACM Jan. 1991 "Groupware".
UIST '91 "MMM: A User Interface Architecture for Shared Editors on a Single Screen" Nov. 11, 1991.

Primary Examiner—Robert B. Harrell
Attorney, Agent, or Firm—Wolf, Greenfield & Sacks, P.C.

[57] ABSTRACT

A device is provided for communicating with a second device in a remote groupware operation. The device includes a sending driver for sending data to the second device, a program operating unit for operating a general purpose application program, an input detector for inputting input data to the general purpose application program, and a input and sending driver for providing the general purpose application program with the input data and for providing the sending driver with the input data to send the input data to the second device.

24 Claims, 18 Drawing Sheets

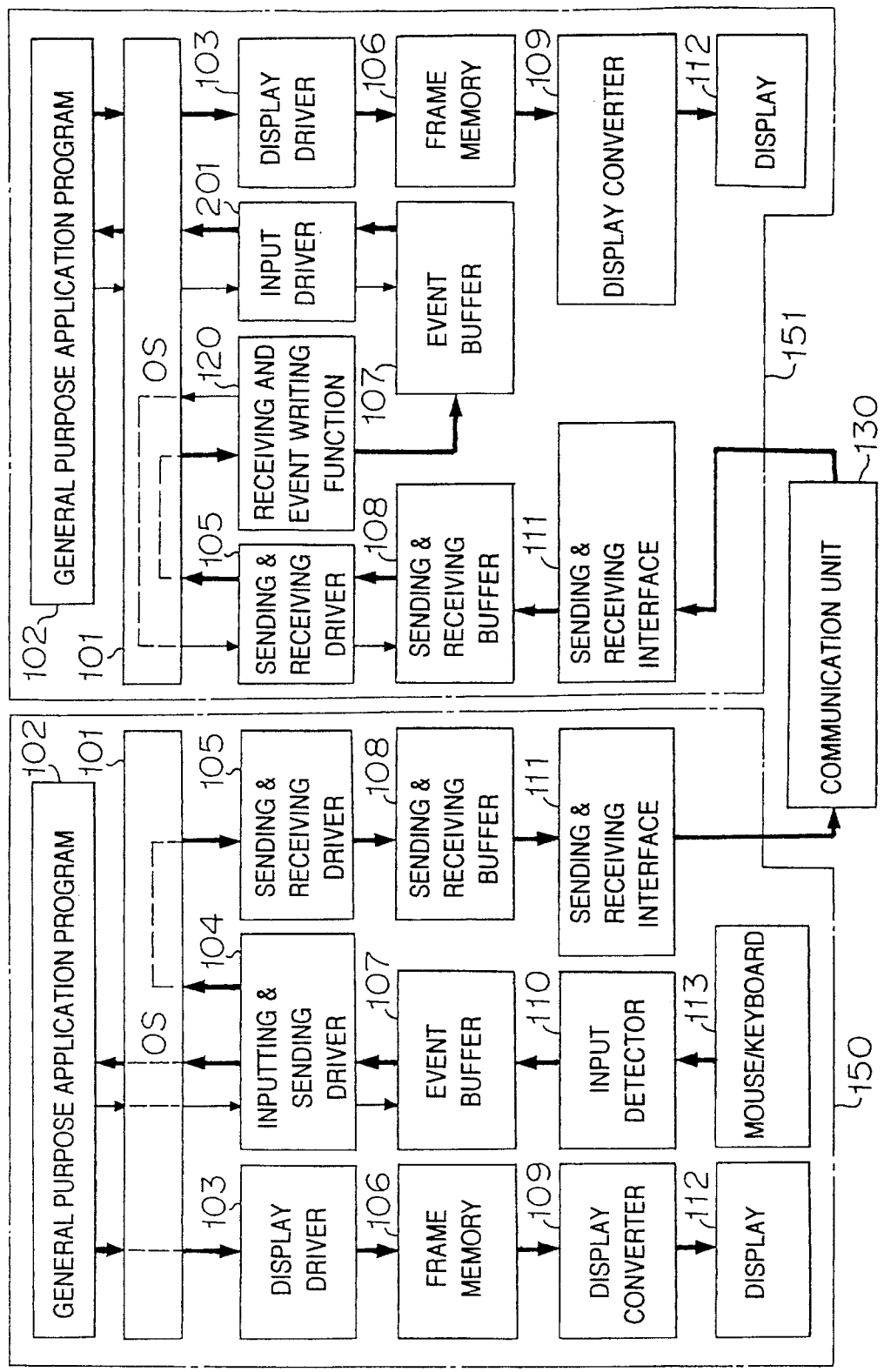

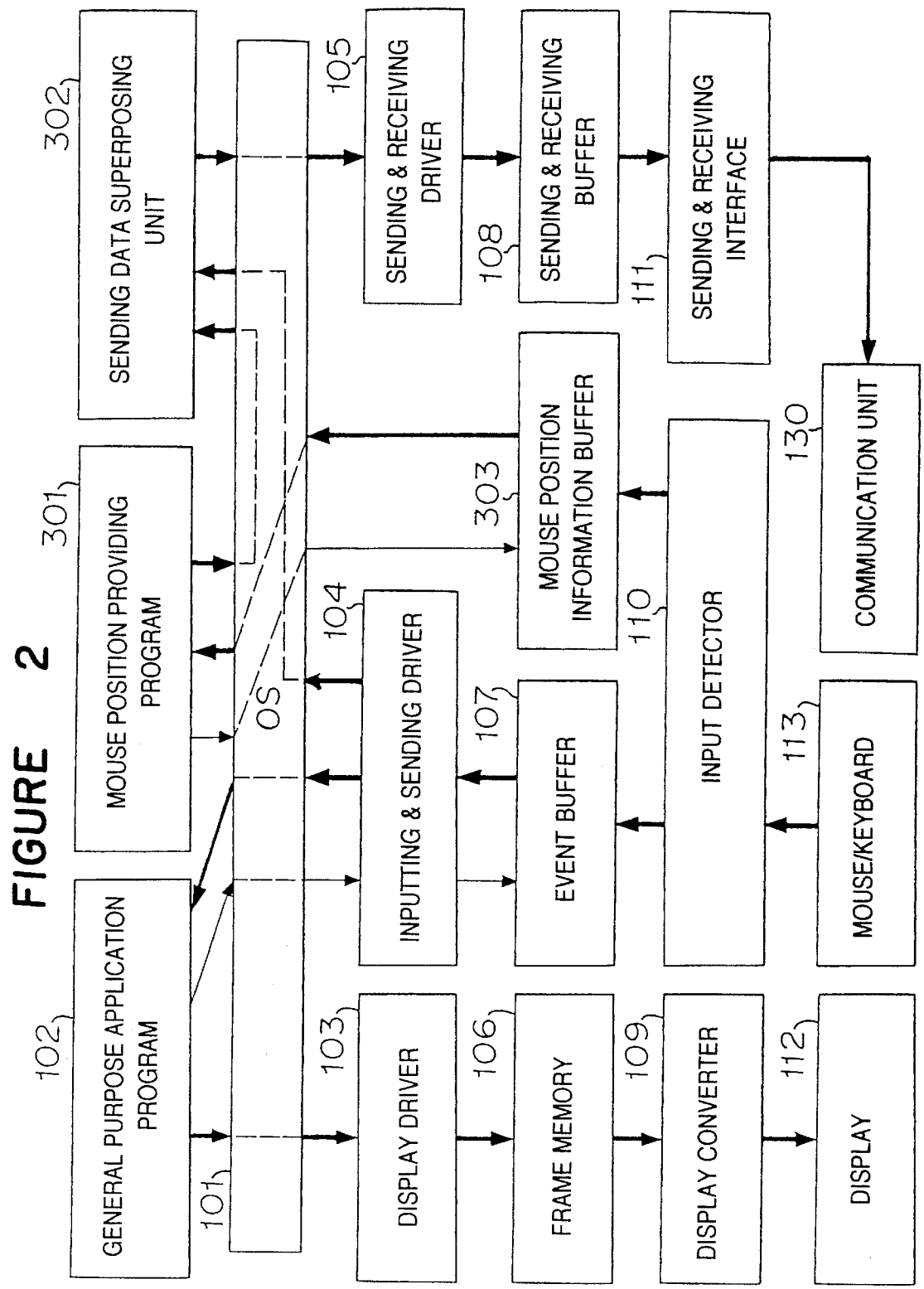

METHOD AND APPARATUS FOR A REMOTE GROUPWARE OPERATING SYSTEM

BACKGROUND OF THE INVENTION

The present invention relates to a remote groupware operation which performs conferencing, document forming and the like in an application program operating on personal computers or workstations (hereinafter described generically and simply "PC") located at remote places.

FIG. 17 is a functional block diagram showing a general execution mode for a general purpose application program on a PC for explaining a conventional remote groupware operation system. In FIG. 17, a reference numeral 101 designates an operating system (hereinafter, "OS"), 102, a general purpose application program, 103, a display driver, 106, a frame memory, 107, an event buffer for storing keyboard entry data, mouse information data and the like (hereinafter described summarizingly "event data"), 109, a display converter, 110, an input detector, 112, a display, 113, mouse/keyboard and 201, an input driver.

Next, an explanation will be given of the operation. First, an explanation will be given of an executing method of a generally-available general purpose application program on a PC. The general application program is executed under an OS of a PC. In most generally-available general purpose application programs 102, data are input from the mouse/keyboard switch 113, processing is performed, and the result of the processing is shown on the display.

In FIG. 17, the event data inputted from the mouse/keyboard is detected by the input detector 110 and stored in the event buffer 107. In the meantime, the general purpose application program 102 starts the input driver 201 through the OS 101 in a process waiting for an input from a user. When the input driver is started, the input driver inspects the event buffer, reads an uninformed event from the event buffer if there is an uninformed event and informs it to the general purpose application program 102 through the OS 101.

After processing, the general purpose application program 102 starts the display driver 103 through the OS 101. The started display driver 103 writes the results to a corresponding portion of the frame memory 106 which is shown on the display 112 by the display converter 109.

Next, FIG. 18 is a diagram showing a conventional groupware operation system described in Japanese Unexamined Patent Publication No. 174436/1990. In FIG. 18, a reference numeral 1201 designates a main body of a PC, 1202, a PC for communication control, 1203, a keyboard, 1204, a keyboard for the PC for communication control, 1205, a memory, 1206, a general purpose application program operating in the main body 1201 of the PC, 1207a through 1207c, serial interfaces, 1208, a CPU and 1209, a communication line.

Next, an explanation will be given of the operation. In FIG. 18, when the general purpose software 1206 is started, the program is introduced into the memory 1205 of the main body 1201 of the PC. At this occasion, a modification is made on a portion of a keyboard entry program in the general purpose software 1206 and a "modified keyboard entry program" 1205b is formed. 1205a designates a main processing portion in the general purpose application program 1206 which is loaded to the memory.

When the keyboard 1203 is pushed, event data are read by the "modified keyboard entry program" 1205b which has been started by the CPU 1208, through the serial interfaces 1207c and 1207b which are sent to the PC for communication control through the serial interface 1207a.

The PC for communication control sends the event data to the communication line 1209 and sends received data wherein data received from the communication line is provided with a data showing the priority, to the "modified keyboard entry program" 1205b through the serial interface 1207a.

The "modified keyboard entry program" 1205b receives both the input from the keyboard 1203 and the input from the PC 1202 for communication control. When the input data from the PC 1202 for communication control is provided with a data showing a higher priority, the input data from the PC 1202 for communication control, is written in a keyboard entry buffer 1205c. In other cases, the input data from the keyboard 1203 is written in the keyboard entry buffer 1205c.

In the conventional remote groupware operation system described as above, a partial modification should be performed on the general purpose software, the PC for communication control is necessary other than the main body of the PC and, therefore, the operation among multipoints is difficult.

It is an object of the present invention to solve the above problem and to achieve a remote groupware operation among multipoints with a small information transfer quantity and without modifying a general purpose application software.

SUMMARY OF THE INVENTION

According to a first aspect of the present invention, there is provided a device on the sending side employed in a remote groupware operation comprising;

(a) a sending means for sending data to the outside;

(b) a program operating means on the sending side for operating a program;

(c) an inputting means on the sending side for inputting input data to be provided to said program operated by said program operating means on the sending side; and (d) an inputting and sending means disposed between the program operating means on the sending side and said inputting means on the sending side for providing the program operated by the program operating means on the sending side with said input data inputted by the inputting means on the sending side and for providing said sending means with the input data inputted by the inputting means on the sending side.

According to a second aspect of the present invention, there is provided a device on the receiving side employed in a remote groupware operation comprising;

(a) a receiving means for receiving input data from a device on the sending side;

(b) a program operating means on the receiving side for operating a first program being the same with a second program operating in said device on the sending side; and (c) an inputting means on the receiving side for providing said first program operated by said program operating means on the receiving side with said input data received by said receiving means.

According to a third aspect of the present invention, there is provided a device on the sending side according to the first aspect, wherein the inputting means on the sending side of the device on the sending side inputs a coordinate position information from a coordinate inputting device as an input data and further comprising; a coordinate position detecting means for detecting said coordinate position information from said coordinate inputting device;

a displaying means for displaying a coordinate position based on the coordinate position information; and a superposing means disposed between the inputting and sending means and the sending means for superposing the coordinate position information detected by said coordinate position detecting means on the input data outputted by the inputting and sending means and for outputting the superposed information to the sending means.

According to a fourth aspect of the present invention, there is provided a device on the receiving side according to the second aspect, further comprising:

a separating means disposed between the receiving means and the inputting means on the receiving side for separating a coordinate position information from the input data inputted by the receiving means; and a displaying means for displaying a coordinate position based on said coordinate position information separated by said separating means.

According to a fifth aspect of the present invention, there is provided a device on the sending side according to the first aspect, wherein the program operating means on the sending side of the device on the sending side is capable of operating a plurality of programs further comprising:

a determining means on the sending side disposed between the inputting and sending means and the sending means for determining a program executing the remote groupware operation among said plurality of programs operated by the program operating means on the sending side and providing the sending means with data related to said program.

According to a sixth aspect of the present invention, there is provided a device on the receiving side according to the second aspect, wherein the program operating means on the receiving side of the device on the receiving side is capable of operating a plurality of programs further comprising:

a determining means on the receiving side included by the inputting means on the receiving side for determining an operational state of a program executing the remote groupware operation among said plurality of programs operated by the program operating means on the receiving side and for retaining the input data inputted by the inputting means on the receiving side based on said operational state.

According to a seventh aspect of the present invention, there is provided a device on the sending side according to the first aspect, further comprising: a relative position converting means for converting an absolute position information contained in the input data sent from the inputting and sending means to the sending means into a relative position information.

According to an eighth aspect of the present invention, there is provided a device on the receiving side according to the second aspect, further comprising: an absolute position converting means for converting a relative position information contained in the input data sent from the receiving means to the inputting means on the receiving side into an absolute position information.

According to a ninth aspect of the present invention, there is provided a remote groupware operation system having a multipoint control unit disposed between the first device on the sending side according to the first aspect and a plurality of the second devices on the receiving side according to the second aspect, said multipoint control unit receiving data from the first device on the sending side and sending the received data to said plurality of the second devices on the receiving side.

According to a tenth aspect of the present invention, there is provided a device on the sending side employed in a remote groupware operation comprising:

(a) a sending means for sending data to the outside;

(b) a program operating means on the sending side for operating a program;

(c) a first inputting means on the sending side for inputting input data;

(d) an inputting and sending means for providing said sending means with said input data inputted by said inputting means on the sending side;

(e) a receiving means for receiving said data; and (f) a second inputting means on the receiving side for inputting the data received by said receiving means to said program operated by said operating means.

According to an eleventh aspect of the present invention, there is provided a remote groupware operating system having a multipoint control unit disposed between the first device on the sending side according to the tenth aspect and the second device on the receiving side according to the second aspect, said multipoint control unit receiving data from the first device on the sending side and sending the received data to the first device on the sending side and the second device on the receiving side.

According to the first aspect of the device on the sending side in the remote groupware operation system of this invention, an event inputted by a mouse or a keyboard enters an event buffer. When the general purpose application program requires an input information, the operation starts an inputting and sending driver. The inputting and sending driver takes out the event data from the event buffer, sends the event data to the general purpose application program and also sends the event data to a communication means by starting the sending and receiving driver. Since the inputting and sending driver is provided with the same function with that of the conventional input driver, a data the same with the event data provided to the general purpose application program can be sent to the outside with no modification to the general purpose application program at all.

According to the second aspect of the device on the receiving side in the remote groupware operation system of this invention, data from the communication means enters a sending and receiving buffer through a sending and receiving interface. A receiving and event writing function starts a sending and receiving driver, reads the received data which has entered the sending and receiving buffer and writes the receive data to an event buffer. Accordingly, it is possible to provide the event data received from the device on the sending side through the communication means, to the general purpose application program with no modification of the general purpose application program at all, when the device on the receiving side is operating the general purpose application program which is the same with that in the device on the sending side. Therefore, the general application program at the device on the receiving side and the general application program at the device on the sending side share the same operation.

According to the third aspect of the device on the sending side in the remote groupware operation system of this invention, a mouse position information enters a mouse position information buffer through an input detector. A mouse position providing program reads the mouse position information from the mouse position information buffer, which is superposed by the event information at a sending data superposing unit and the operation starts a sending and receiving driver to thereby send the data to the communication means.

According to the fourth aspect of the device on the receiving side in the remote groupware operation system of this invention, a sending and receiving driver is started by both a receiving and event writing function and an other party mouse position providing program, the received data is separated into the event data and the mouse position information at the received data separating unit and the respective data are informed to a receiving and event writing function and an other party mouse position providing program.

According to the fifth aspect of the device on the sending side in the remote groupware operation system of this invention, an application program execution determining unit determines a program executing the remote groupware operation among a plurality of operating programs, selects data which are related to the remote groupware operation among event data sent from an inputting and sending driver and a mouse position information sent from a mouse position providing program and sent them to the outside.

According to the sixth aspect of the device on the receiving side in the remote groupware operation system of this invention, an application program execution determining unit determines an operational state of the program executing the remote groupware operation and instructs the start and stop of an other party mouse position providing program, the writing of data from a receiving and event writing function to a temporary memory buffer and the transfer of data from the temporary buffer to the event buffer. Therefore, even when the program executing the remote groupware operation stops the execution while the other programs are operating, the data of the program executing the remote groupware operation are not lost.

According to the seventh aspect of the device on the sending side in the remote groupware operation system of this invention, event data and a mouse position information which have been sent from an application program execution determining program, are changed with respect to a relative position and sent to the outside. Accordingly, for instance, when the data are displayed by employing a window, the positions of the data in the window are correctly displayed.

According to the eighth aspect of the device on the receiving side in the remote groupware operation system of this invention, event data and a mouse position information sent from a received data separating unit are changed with respect to absolute positions by an absolute position converting unit.

According to the ninth aspect of the remote groupware operation system of this invention, data sent from a PC on the sending side enters an MCU (multipoint control unit) wherein the data are copied and distributed to PCs on the receiving side.

According to the tenth and eleventh aspects of the remote groupware operation system of this invention, an input from the mouse/keyboard enters an inputting and sending driver through an input detector and enters an MCU through a sending and receiving buffer, a sending and receiving interface and a communication line by a sending and receiving driver. At the MCU, the data are sent to the other PCs on the receiving side and also to the PC on the sending side. At the PC on the sending side, a receiving and event writing function reads the data through the sending and receiving interface, the sending and receiving buffer and the sending and receiving driver, and writes the data to an event buffer.

BRIEF DESCRIPTION OF THE DRAWINGS

In the drawings:

FIG. 1 is a functional block diagram explaining embodiment 1 in a remote groupware operation system according to the present invention;

FIG. 2 is a functional block diagram showing embodiment 2 in a remote groupware operation system according to the present invention;

FIGS. 8A-1, 8A-2, 8B-1 and 8B-2 are diagrams showing a change of a relative position in the remote groupware operation system according to the present invention;

DETAILED DESCRIPTION

Example 1

An explanation will be given of an embodiment of the present invention in reference to the drawings as follows.

Figures 1, 2, 8A:
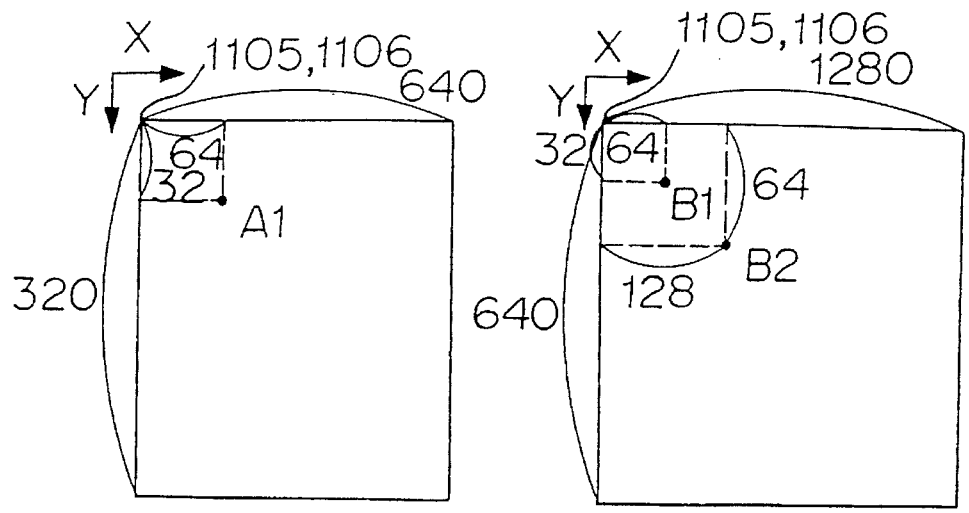

FIG. 1 is a functional block diagram showing an example of a remote group operation system according to the present invention. In FIG. 1, a reference numeral 101 designates an OS, 102, a general purpose application program, 103, a display driver, 104, an inputting and sending driver, 105, a sending and receiving driver, 106, a frame memory, 107, an event buffer, 108, a sending and receiving buffer, 109, a display converter, 110, an input detector, 111, a sending and receiving interface, 112, a display, 113, mouse/keyboard, 120, a receiving and event writing function, 130, a communication unit, 150, a PC on the sending side, 151, a PC on the receiving side and 201, an input driver.

Next, an explanation will be given of the operation of this embodiment in reference to FIG. 1 as an example. In FIG. 1, a case is shown wherein the general purpose application programs 102 in both the PC 150 on the sending side and the PC 151 on the receiving side, are operated by an input operation at the PC 150 on the sending side.

An input by the mouse/keyboard 113 of the PC 150 on the sending side is detected by the input detector 110 and is stored in the event buffer 107. In the meantime, when the general purpose application program 102 at the PC 150 on the sending side requires an input, the operation starts the input driver through the OS 101 as in the conventional example. In this example, since the inputting and sending driver 104 is disposed at the same portion with that of the input driver in view of the application program, the operation starts the inputting and sending driver.

The inputting and sending driver 104 reads the event data from the event buffer 107, sends the event data to the sending and receiving driver 105 and at the same time, sends the event data to the general purpose application program 102. The display operated by the general purpose application program 102 is the same as in the conventional example and its explanation will be omitted.

The data which have entered the sending and receiving driver 105 are temporarily stored in the sending and receiving buffer 108 and sent to the sending and receiving interface 111 of the PC 151 on the receiving side at a remote place through the communication unit 130.

When the sending and receiving interface 111 of the PC 151 on the receiving side has received the data, the operation temporarily stores the data in the sending and receiving buffer 108. The receiving and event writing function 120 according to this embodiment periodically starts the sending and receiving driver 105 and checks received data. The started sending and receiving driver 105 checks the sending and receiving buffer 108 and informs the data to the receiving and event writing function 120 if there are any.

The receiving and event writing function 120 which has received the data writes the data to the event buffer 107. In the meantime, when the general purpose application program 102 in the PC 151 on the receiving side requires an input, the general application program 102 starts the input driver 201 through the OS 101. The started input driver 201 reads the data in the event buffer 107 and sends them to the general purpose application program 102. The display by the general purpose application program 102 is the same as in the conventional example and its explanation will be omitted.

Accordingly, the event data which have been provided to the general purpose application program 102 in the PC 150 on the sending side by the inputting and sending driver 104 are the same with the event data which have been provided to the PC 151 on the receiving side by the input driver 201, and the operations of the general purpose application programs 102 in the two sets of PCs are the same.

As stated above, in this example, the same general purpose application program having no communication function is installed in each one of two or more sets of personal computers or workstations as they are, without modifying the application program to provide a special exclusive function. These personal computers or workstations are connected by telephone lines or a network such as LAN, or a substitute communication means. An input from one PC is sent to the general purpose softwares of one or a plurality of other connected PCs.

Example 2

FIG. 2 is a functional block diagram showing a remote groupware operation system of an embodiment of this invention. In FIG. 2, a reference numeral 101 designates the OS, 102, the general purpose application program, 103, the display driver, 104, the inputting and sending driver, 105, the sending and receiving driver, 106, the frame memory, 107, the event buffer, 108, the sending and receiving buffer, 109, the display converter, 110, the input detector, 111, the sending and receiving interface, 112, the display, 113, the mouse/keyboard, 130, the communication unit, 301, a mouse position providing program, 302, a sending data superposing unit and 303, a mouse position information buffer.

Figure 3:
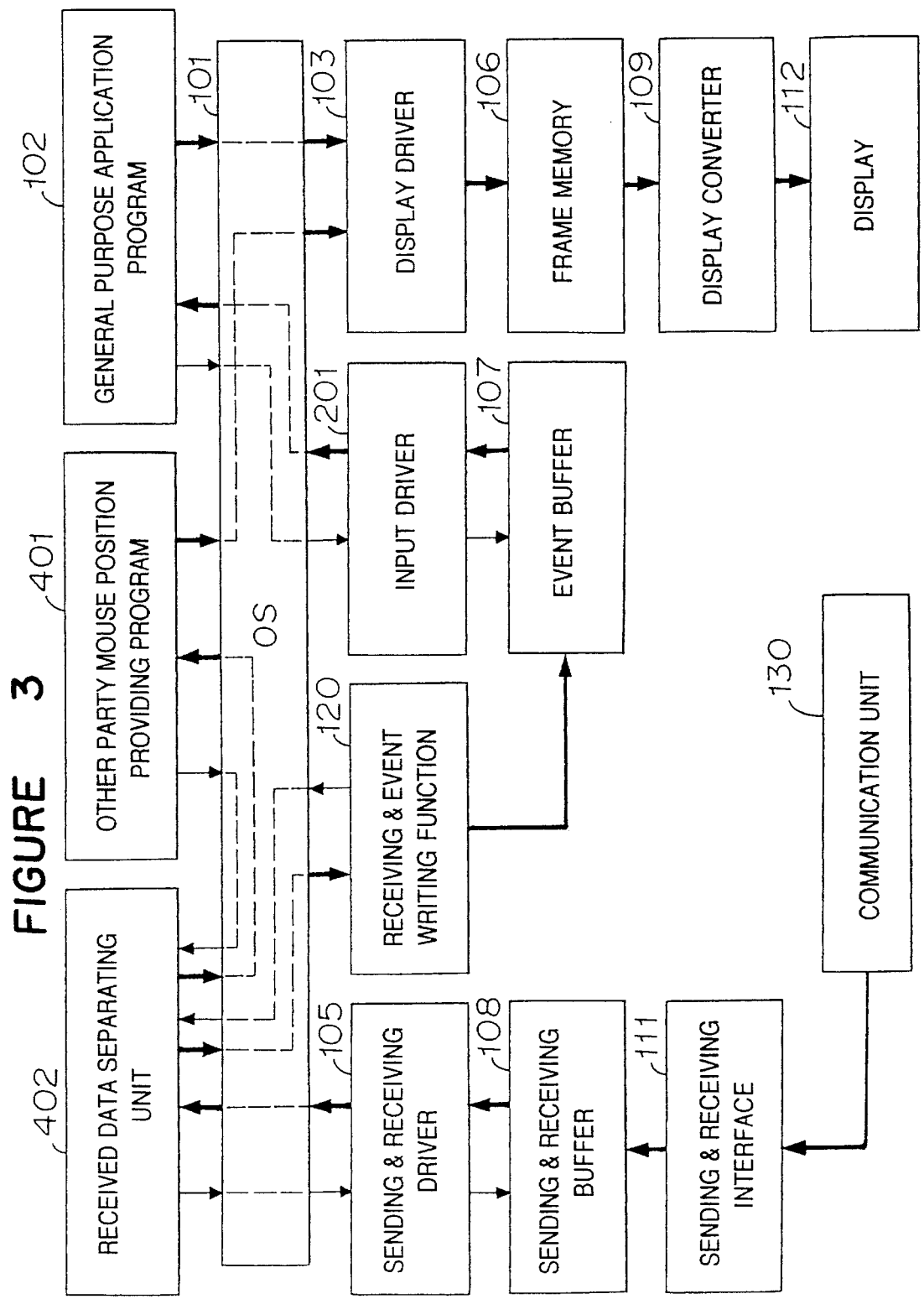
FIG. 3 is a functional block diagram showing embodiment 3 in a remote groupware operation system according to the present invention.

Furthermore, FIG. 3 is a functional block diagram showing the remote groupware operation system of the embodiment. In FIG. 3, a reference numeral 101 designates the OS, 102, the general purpose application program, 103, the display driver, 105, the sending and receiving buffer, 106, the frame memory, 107, the event buffer, 108, the sending and receiving buffer, 109, the display converter, 111, the sending and receiving interface, 112, the display, 120, the sending and event writing function, 130, the communication unit, 201, the input driver, 401, an other party mouse position providing program and 402, a received data separating unit.

Next, an explanation will be given of the operation on the sending side with respect to the remote groupware operation system according to this embodiment in reference to FIG. 2. In FIG. 2, when the mouse 113 moves, the input detector 110 detects the movement and writes the current mouse position to the mouse position information buffer 303.

The mouse position information providing program 301 periodically reads the value of the mouse position information buffer and sends the mouse position information to the sending data superposing unit 302.

On the other hand, the event data from the inputting and sending driver 104 is also sent to the sending data superposing unit 302. The mouse position information is superposed on the event data in the sending data superposing unit 302 and the superposed result is sent to the sending and receiving driver 105. The sending method of the data and the image plane display operated by the general purpose application program 102 are the same with those in Example 1 and its explanation will be omitted.

Next, an explanation will be given of the operation on the receiving side with respect to the remote groupware operation system according to this embodiment in reference to FIG. 3. In FIG. 3, when the receiving side receives the data from the communication means 130, the data is temporarily stored in the sending and receiving buffer 108 by the sending and receiving interface 111, as in Example 1.

Both the receiving and event writing function 120 and the other party mouse position providing program 401 according to this embodiment periodically start the sending and receiving driver 105. The sending and receiving driver 105 sends the received data to the received data separating unit 402.

The received data separating unit 402 classifies the received data into the event data or the mouse position information and sends the classified and separated data to the receiving and event writing function 120 and the other party mouse position providing program 401, respectively.

When the other party mouse position providing program 401 receives the mouse position information, the other party mouse position providing program 401 starts the display driver 103 such that a pointer which is capable of indicating the other party mouse position at a corresponding position, is shown. Furthermore, the treatment after the receiving and event writing function 120 has received the data is the same as in Example 1 and its explanation will be omitted.

Example 3

Figure 4:
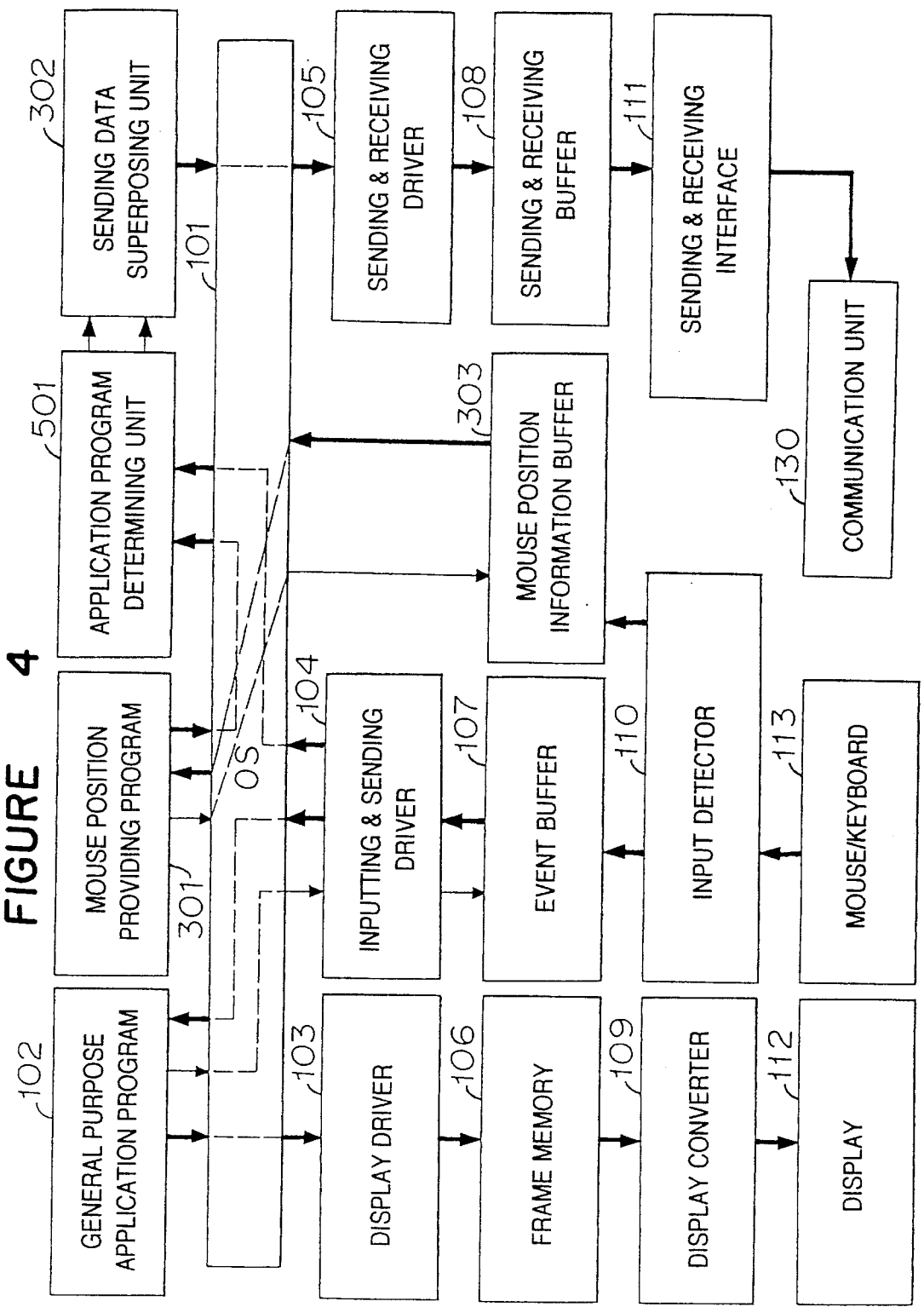
FIG. 4 is a functional block diagram showing embodiment 3 in the remote groupware operation system according to the present invention.

FIG. 4 is a functional block diagram showing the sending side of the remote groupware operation system of this embodiment. In FIG. 4, a reference numeral 101 designates the OS, 102, the general purpose application program, 103, the display driver, 104, the inputting and sending driver, 105, the sending and receiving driver, 106, the frame memory, 107, the event buffer, 108, the sending and receiving buffer, 109, the display converter, 110, the input detector, 111, the sending and receiving interface, 112, the display, 113, the mouse/keyboard, 130, the communication unit, 301, the mouse position providing program, 302, the sending data superposing unit, 303, the mouse position information buffer and 501, an application program execution determining unit.

Figure 5:
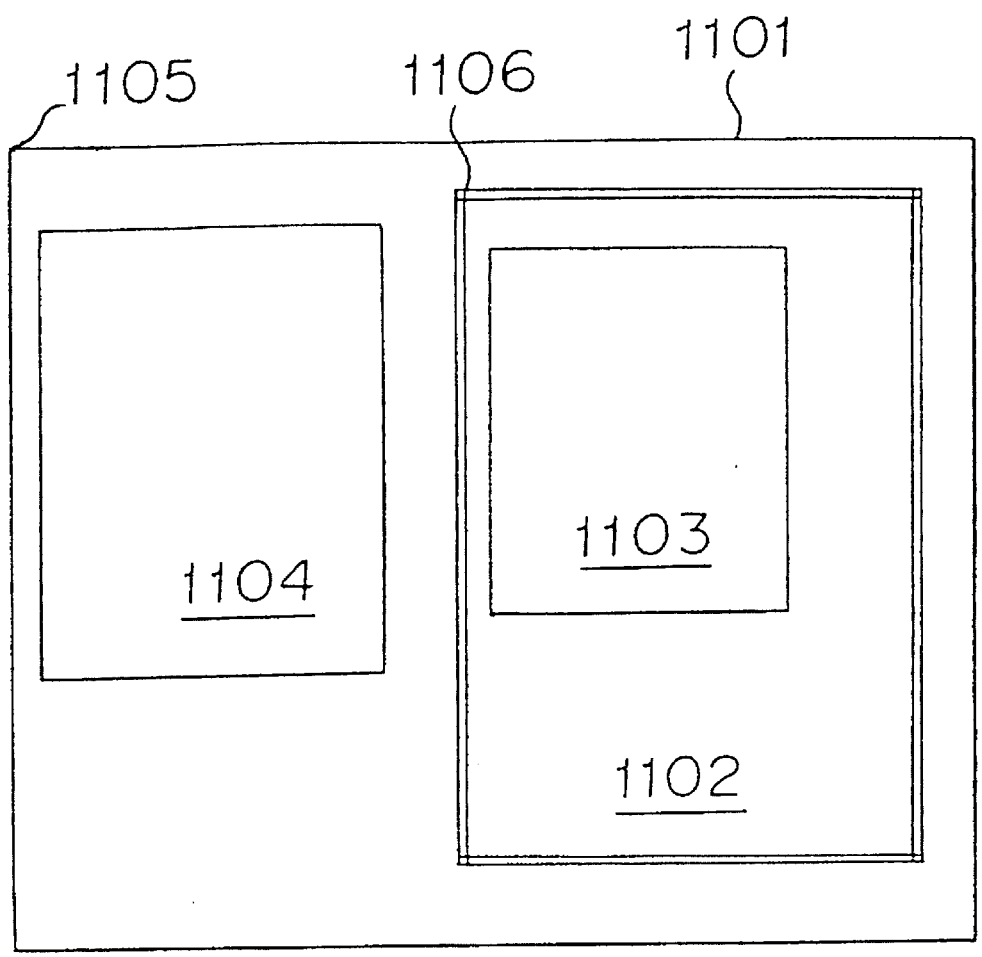
FIG. 5 is an explanatory diagram showing a groupware window in the remote groupware operation system according to the present invention.

Next, an explanation will be given of a groupware window according to this embodiment. FIG. 5 is a diagram for explaining the groupware window. In FIG. 5, a reference numeral 1101 designates a PC image plane. A numeral 1102 designates the groupware window, the inside of which is in the same state with respect to all the PCs executing the groupware operation. A numeral 1103 designates an application program window in the groupware window which is a window for an arbitrary general purpose application program, and which is in the same state with respect to all the PCs executing the groupware operation since the application program window is incorporated in the groupware window. A numeral 1104 designates a local application program window, which is a window for an arbitrary application program that is executed independently in each PC.

Next, an explanation will be given of the operation of the sending side with respect to the remote groupware operation system according to this embodiment, in reference to FIG. 4. In FIG. 4, the application program execution determining unit 501 determines whether the current operational state is with respect to the window employed in the groupware operation.

The event data which is bound for the sending data superposing unit 302 from the inputting and sending driver 104 enters the application program execution determining unit 501. The application program execution determining unit 501 sends the event data to the sending data superposing unit 302 only when the current operational state is with respect to the window employed in the groupware operation.

Similarly, the mouse position information which is bound for the sending data superposing unit from the mouse position providing program 301 enters the application program execution determining unit 501. The application program execution determining unit 501 sends the mouse position information to the sending data superposing unit 302 only when the current operational state is with respect to the window employed in the groupware operation.

Example 4

Figure 6:
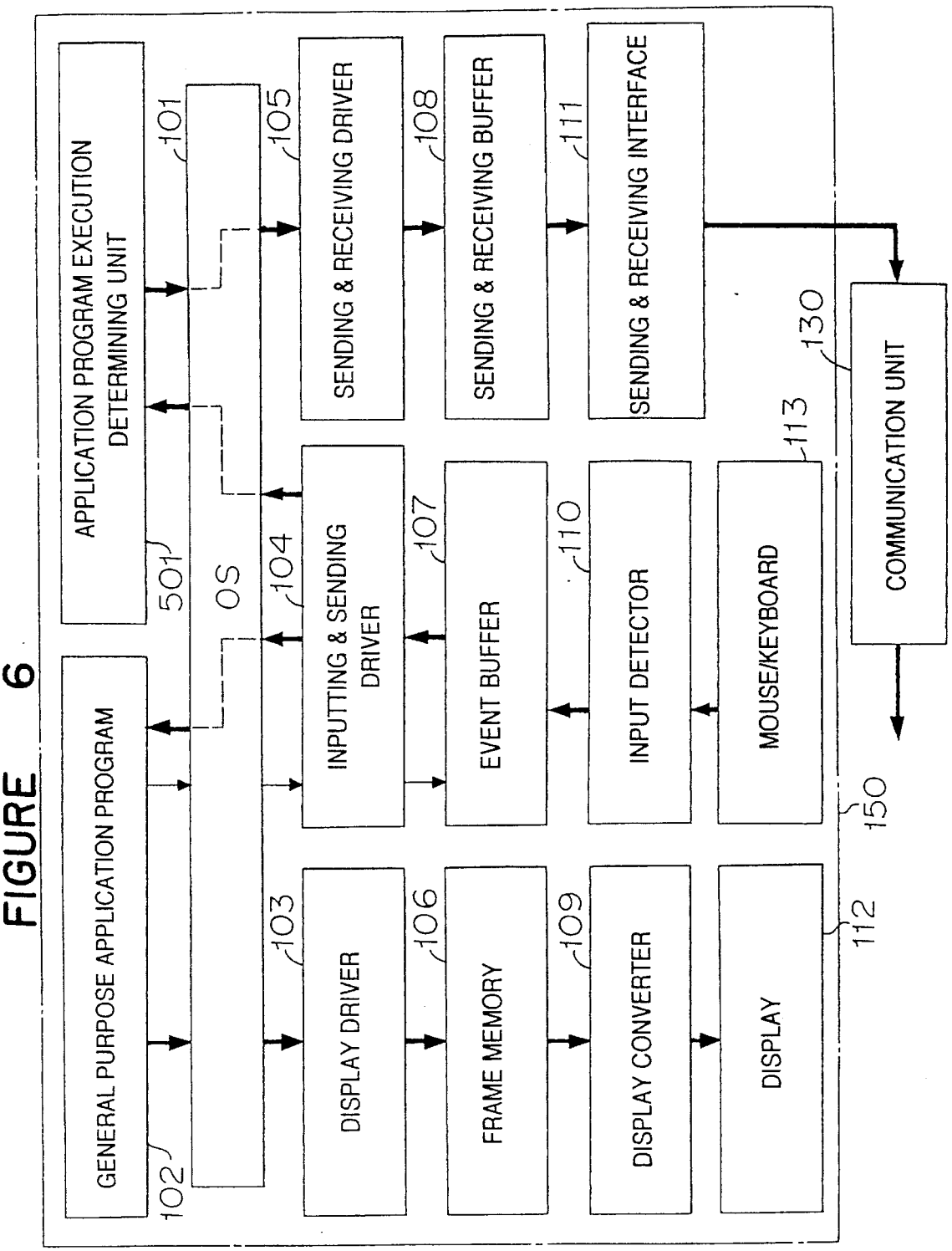
FIG. 6 is a functional block diagram showing embodiment 4 in a remote groupware operation system according to the present invention.

In the above Example 3, the embodiment 3 has been described to include the function of the Example 2. However, it is possible to propose a construction wherein the function of the embodiment 2 is eliminated, as shown in FIG. 6.

That is to say, the event data from the inputting and sending driver 104 enters the application program execution determining unit 501. The application program execution determining unit 501 sends the event data to the sending and receiving driver only when the current operational state is with respect to the window employed in the groupware operation.

Example 5

Figure 7:
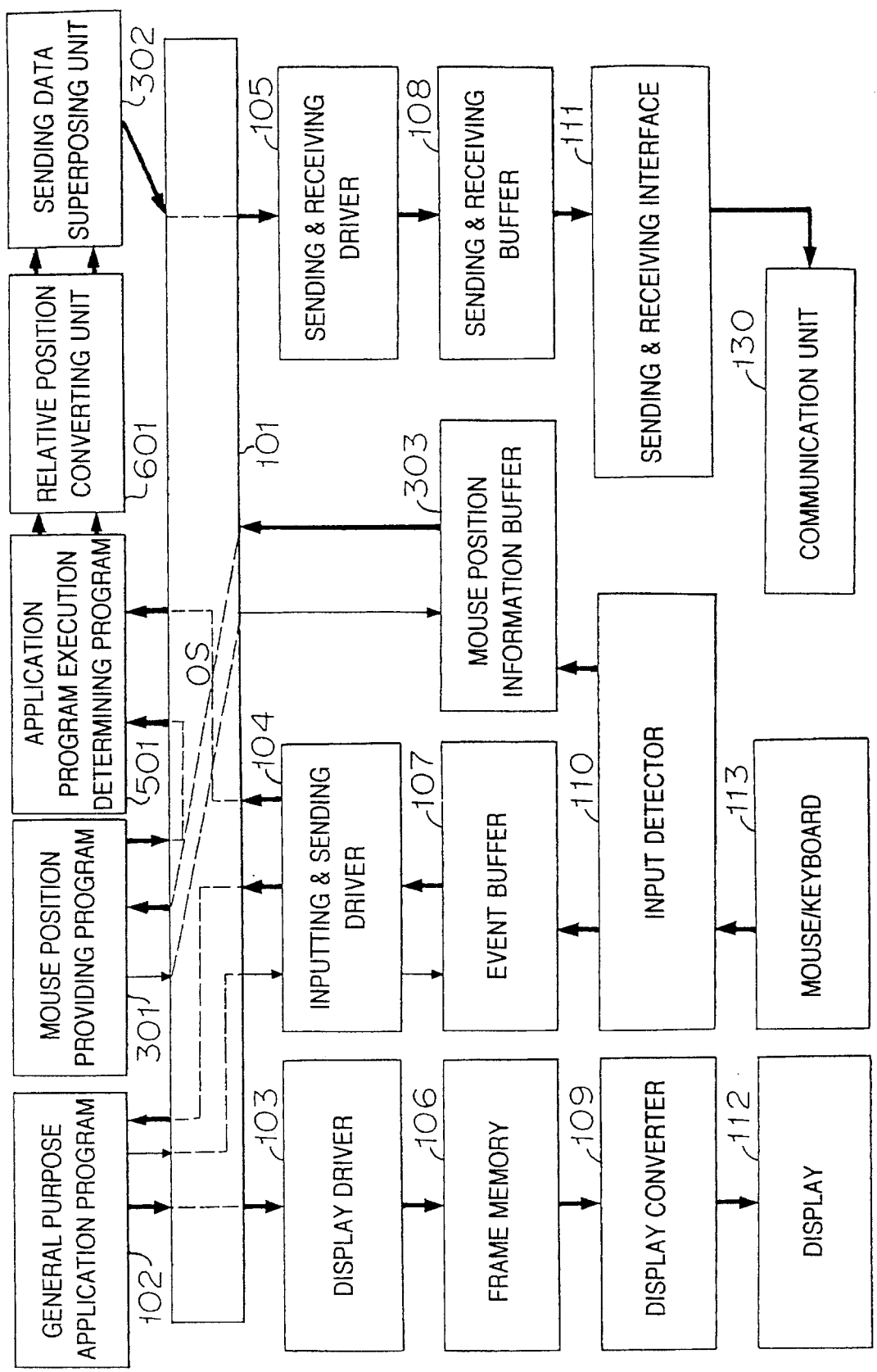
FIG. 7 is a functional block diagram showing embodiment 5 in a remote groupware operation system according to the present invention.

FIG. 7 is a functional block diagram showing the sending side of the remote groupware operation system according to this embodiment. In FIG. 7, a reference numeral 101 designates the OS, 102, the general purpose application program, 103, the display driver, 104, the inputting and sending driver, 105, the sending and receiving driver, 106, the frame memory, 107, the event buffer, 108, the sending and receiving buffer, 109, the display converter, 110, the input detector, 111, the sending and receiving interface, 112, the display, 113, the mouse/keyboard, 130, the communication unit, 301, the mouse position providing program, 302, the sending data superposing unit, 303, the mouse position information buffer, 501, the application program execution determining unit and 601, a relative position converting unit.

Next, an explanation will be given of the operation on the sending side with respect to the remote groupware operation system according to this embodiment. In FIG. 7, position information in the event information and the mouse position information which are outputted from the application program execution determining program 501, is inputted to the relative position converting unit 601.

The position information in the event information and the mouse position information are expressed in a coordinate system having an absolute reference point 1105. The relative position converting unit 601 changes the absolute coordinate system to a relative coordinate system having a window reference point 1106 in FIG. 5 and sends the converted data to the sending data superposing unit 302.

Therefore, by sending the data of which position is converted in the relative coordinate system, the groupware operation can be achieved even when the display resolutions of the PC image plane on the sending side and the PC image plane on the receiving side are different as shown in FIGS. 8A-1 and 8A-2. For instance, when the PC image plane on the sending side is provided with the display resolution of 640×320 dots, whereas the PC image plane on the receiving side is provided with the display resolution of 1280×640 dots, the position of point A1 on the PC image plane on the sending side is X=64 and Y=32, which is converted to point B1 on the PC image plane on the receiving side by employing the absolute coordinate system. However, when the relative coordinate system is employed, $X=64/640=0.1, Y=32/320=0.1$, which is displayed on the PC image plane on the receiving side as point B2 which is relatively the same location with that of point A1 on the sending side.

Figures 1, 2, 8B:
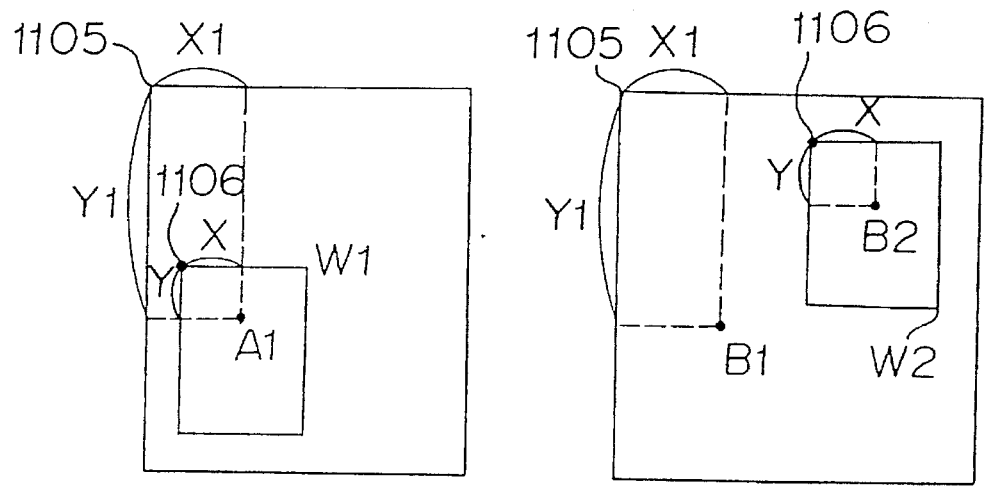

Furthermore, by sending the data after converting the position employing the relative coordinate system, the groupware operation is made possible even when the window display positions of the PC image plane on the sending side and the PC image plane on the receiving side are different as shown in FIGS. 8B-1 and 8B-2. For instance, when the PC image plane on the sending side displays a window W1 at the left bottom portion of the image plane and the PC image plane on the receiving side displays a window W2 executing the groupware operation at the right top portion of the image plane as shown in FIGS. 8B-1 and 8B-2, point A1 on the PC image plane on the sending side is converted to point B1 on the PC image plane on the receiving side by employing the absolute coordinate X1 and Y1. However, point B1 is converted to point B2 on the PC image plane on the receiving side by employing the relative coordinate X and Y which is the same location with respect to the windows W1 and W2.

Furthermore, the same position can be indicated similarly by employing the relative coordinate even when the display resolutions of the PC image plane on the sending side and the PC image plane on the receiving side are different and the window display positions are different.

The sending operation and the displaying operation are the same as in the above Examples and their explanation will be omitted.

Example 6

Figure 9:
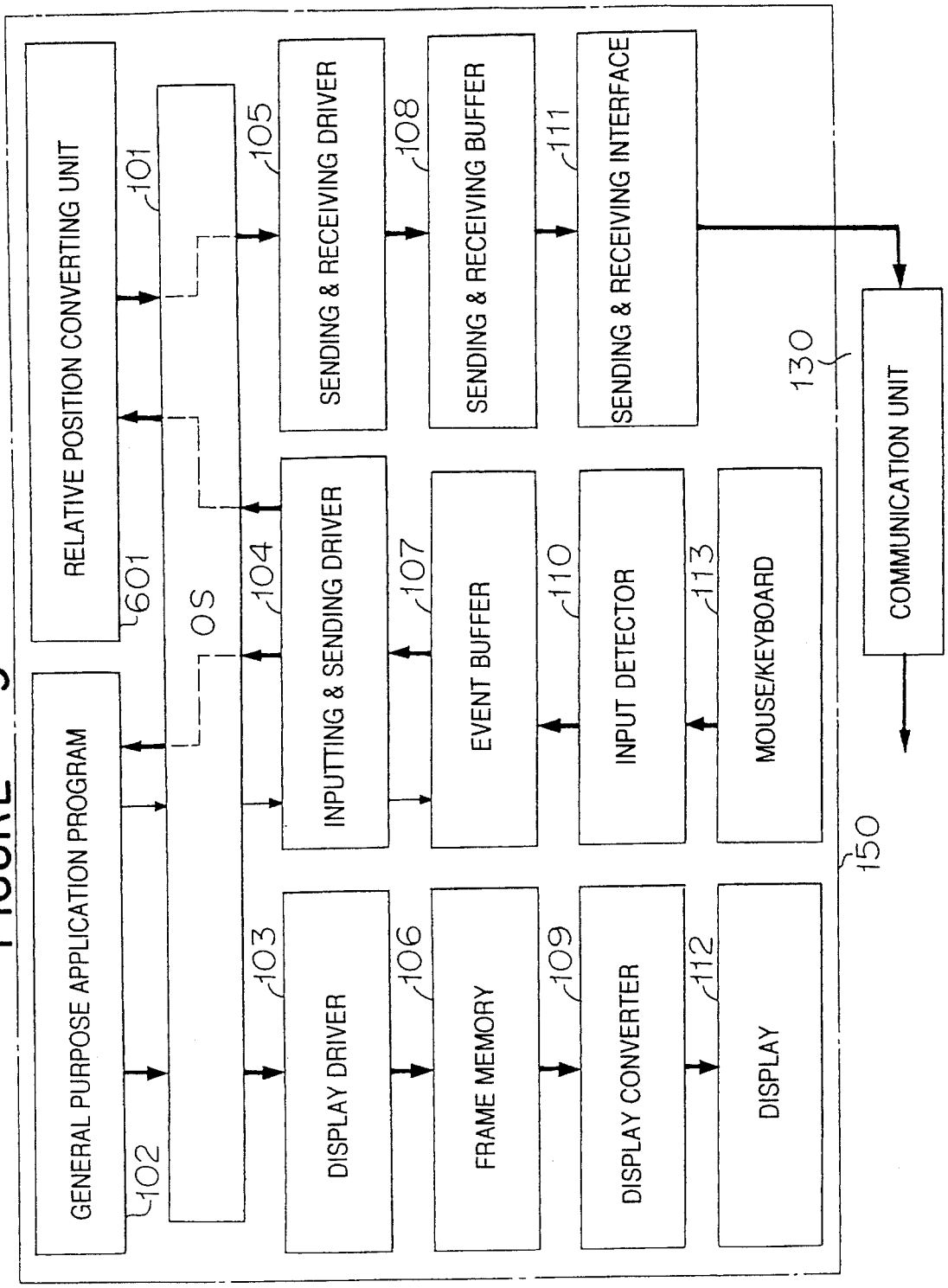
FIG. 9 is a functional block diagram showing embodiment 6 in a remote groupware operation system according to the present invention.
Figure 10:
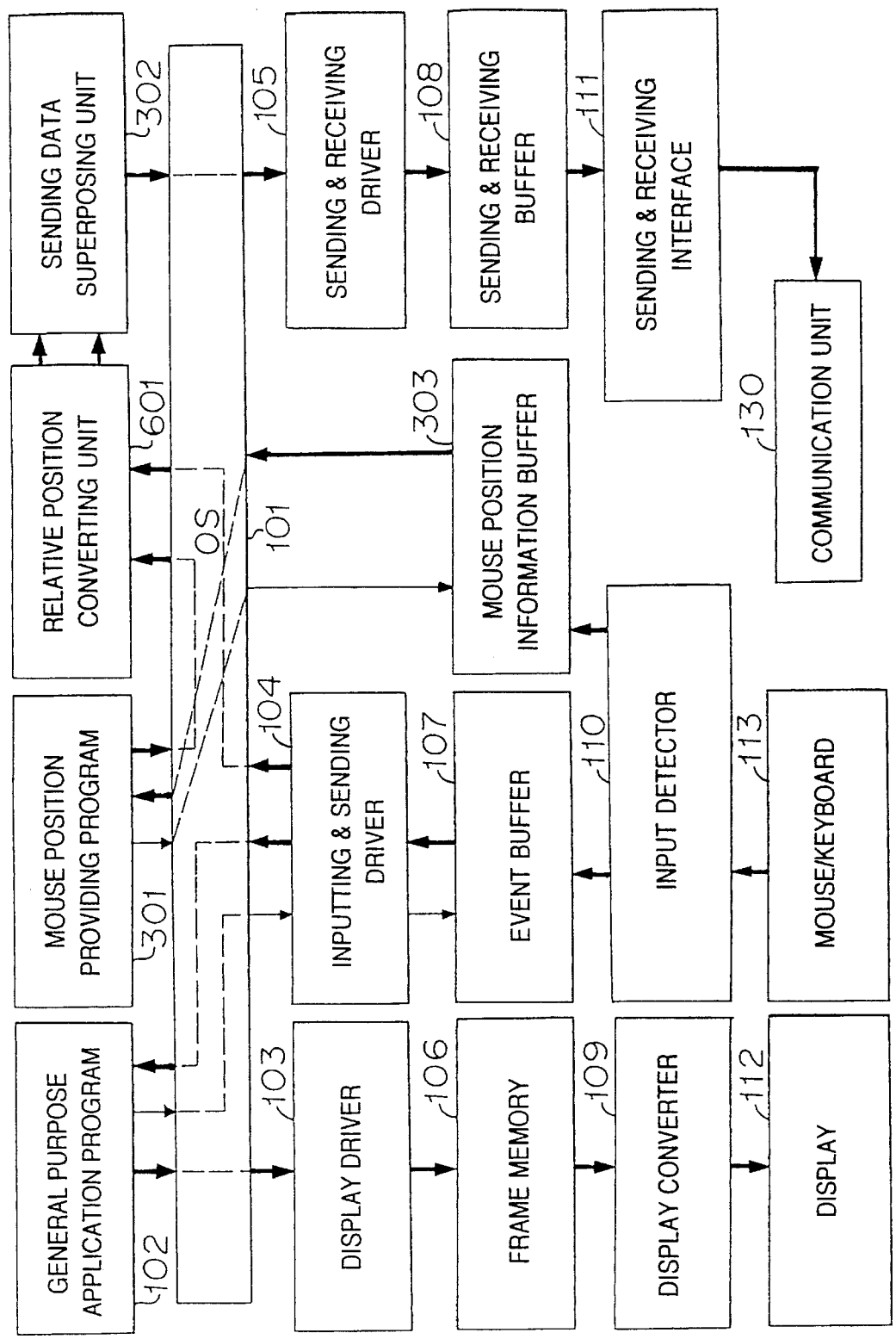
FIG. 10 is a functional block diagram showing the embodiment 6 in the remote groupware operation system according to the present invention.

The above Example 5 has been described wherein the functions of Example 2 and Example 3 have been incorporated in the construction. However, it is possible to propose a construction wherein the functions of Example 2 and Example 3 are eliminated. FIG. 9 is a diagram showing a construction wherein the functions of Example 2 and Example 3 are eliminated. Further, FIG. 10 is a diagram showing a construction wherein the function of Example 3 is eliminated.

Example 7

Figure 11:
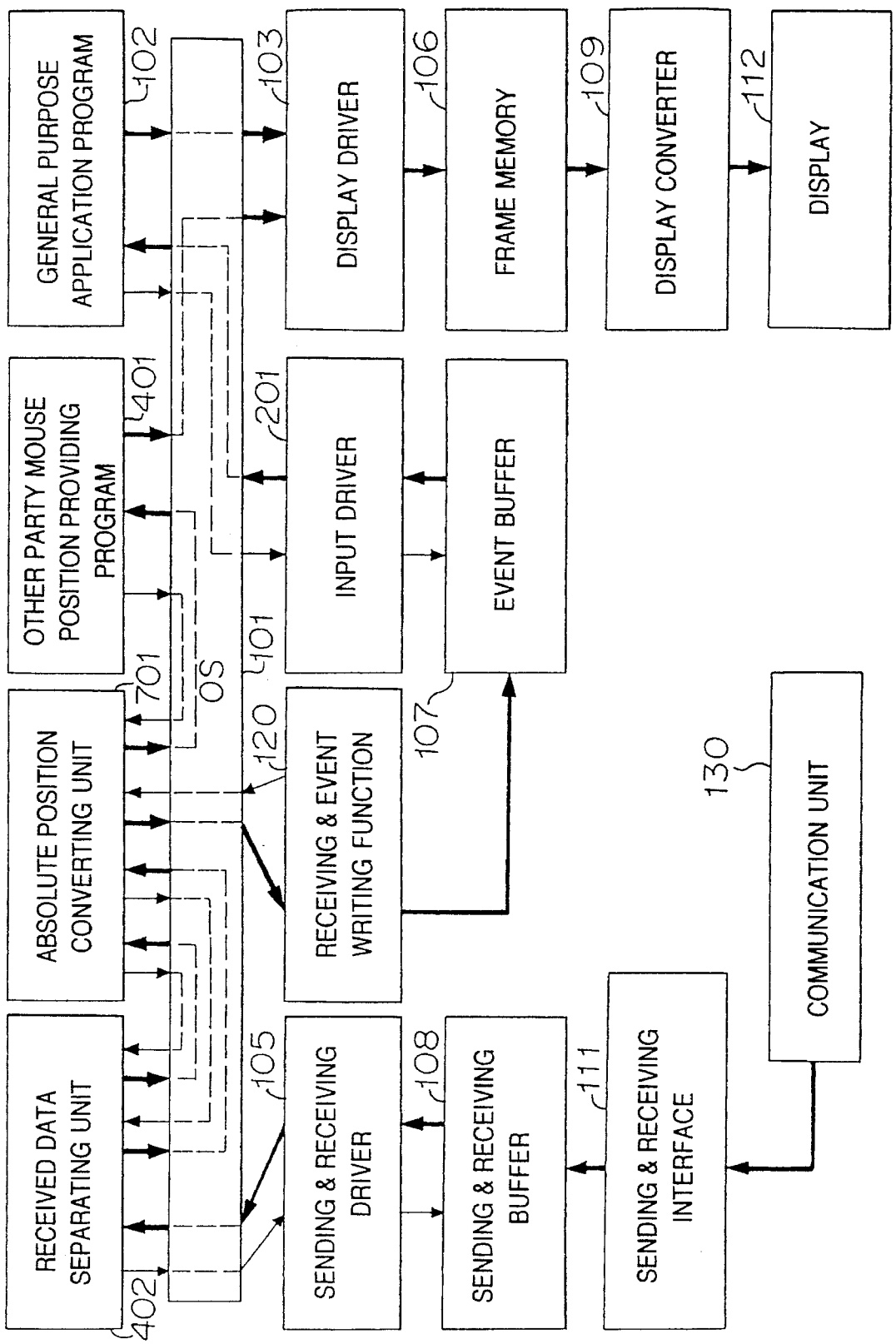
FIG. 11 is a functional block diagram showing embodiment 7 in a remote groupware operation system according to the present invention.

FIG. 11 is a functional block diagram on the receiving side showing a remote groupware operation system according to the embodiment. In FIG. 11, a reference numeral 101 designates the OS, 102, the general purpose application program, 103, the display driver, 105, the sending and receiving driver, 106, the frame memory, 107, the event buffer, 108, the sending and receiving buffer, 109, the display converter, 111, the sending and receiving interface, 112, the display, 120, the receiving and event writing function, 130, the communication unit, 201, the input driver, 401, the other party mouse position providing program, 402, a received data separating unit and 701, an absolute position converting unit.

Next, an explanation will be given of the operation on the receiving side with respect to the remote groupware operation system in accordance with the present embodiment. Since the receiving operation and the displaying operation are the same as in the above Examples, an explanation will be given of the portion according to this embodiment. The position information portion of the event data and the mouse position information separated by the received data separating unit 402, enter the absolute converting unit 701 in accordance with this embodiment, in FIG. 11.

The absolute position converting unit 701 converts the position information portion of the event data and the mouse position information which have been sent under the relative coordinate system having the window reference point 1106, to the positions under the absolute coordinate system having the absolute reference point 1105, and sends the converted data to the receiving and event writing function 120 and the other party mouse position providing program 401, respectively. Accordingly, the remote groupware operation is made possible even when the absolute positions of the groupware windows in the PC on the sending side and the PC on the receiving side are different.

Example 8

Figure 12:
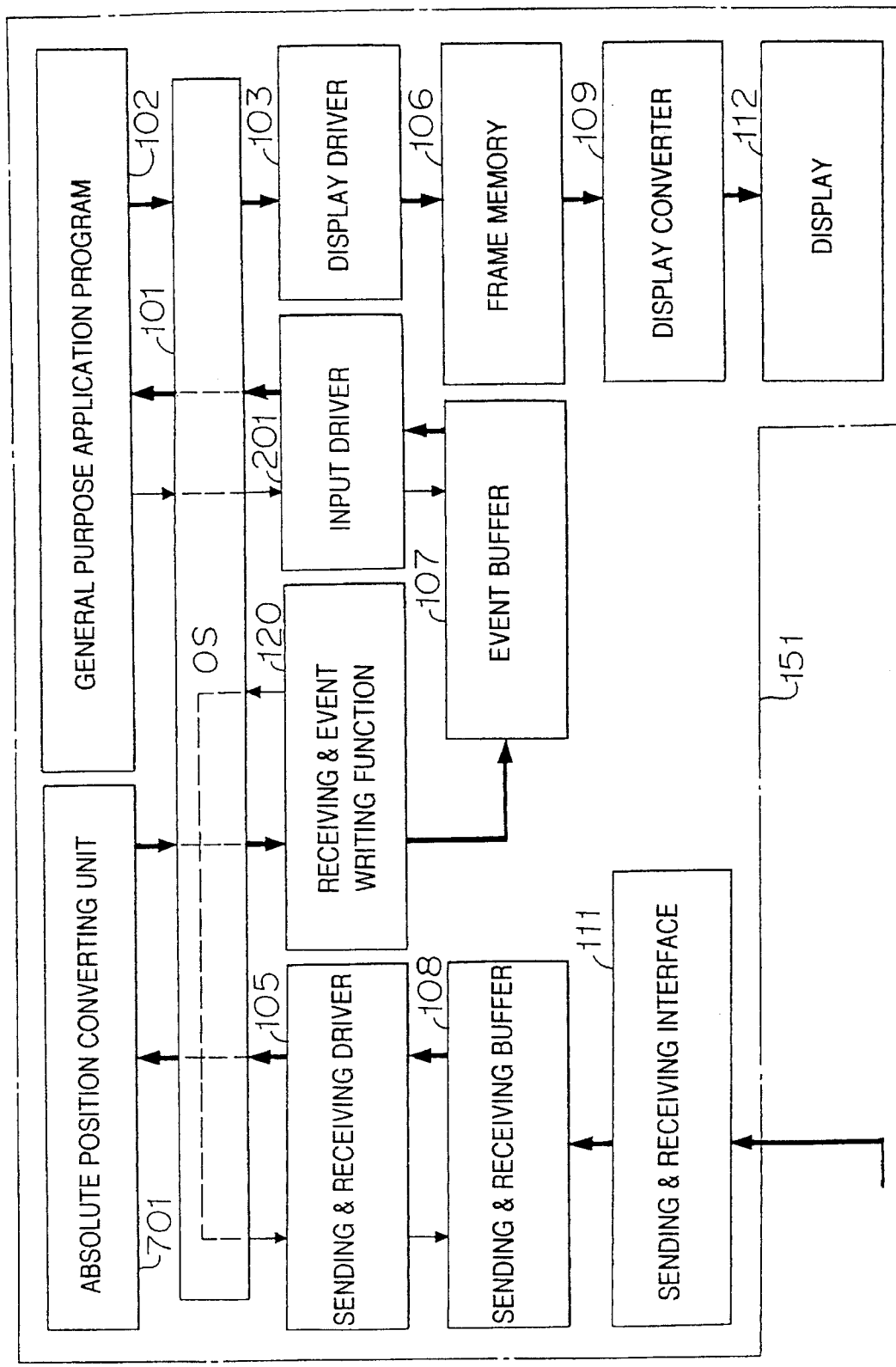
FIG. 12 is a functional block diagram showing embodiment 8 in a remote groupware operation system according to the present invention.

The above Example 7 has been described wherein the function of Example 2 has been incorporated in the above Example. However, it is possible to propose a construction wherein the function of Example 2 is eliminated. FIG. 12 is a diagram showing a construction wherein the function of Example 2 is eliminated. In FIG. 12, the absolute position converting unit 701 changes the position information portion of the event data which has been sent under the relative coordinate system having the window reference point 1106 to the position under the absolute coordinate system having the absolute reference point 1105 and sent the converted data to the receiving and event writing function 120.

Example 9

Figure 13:
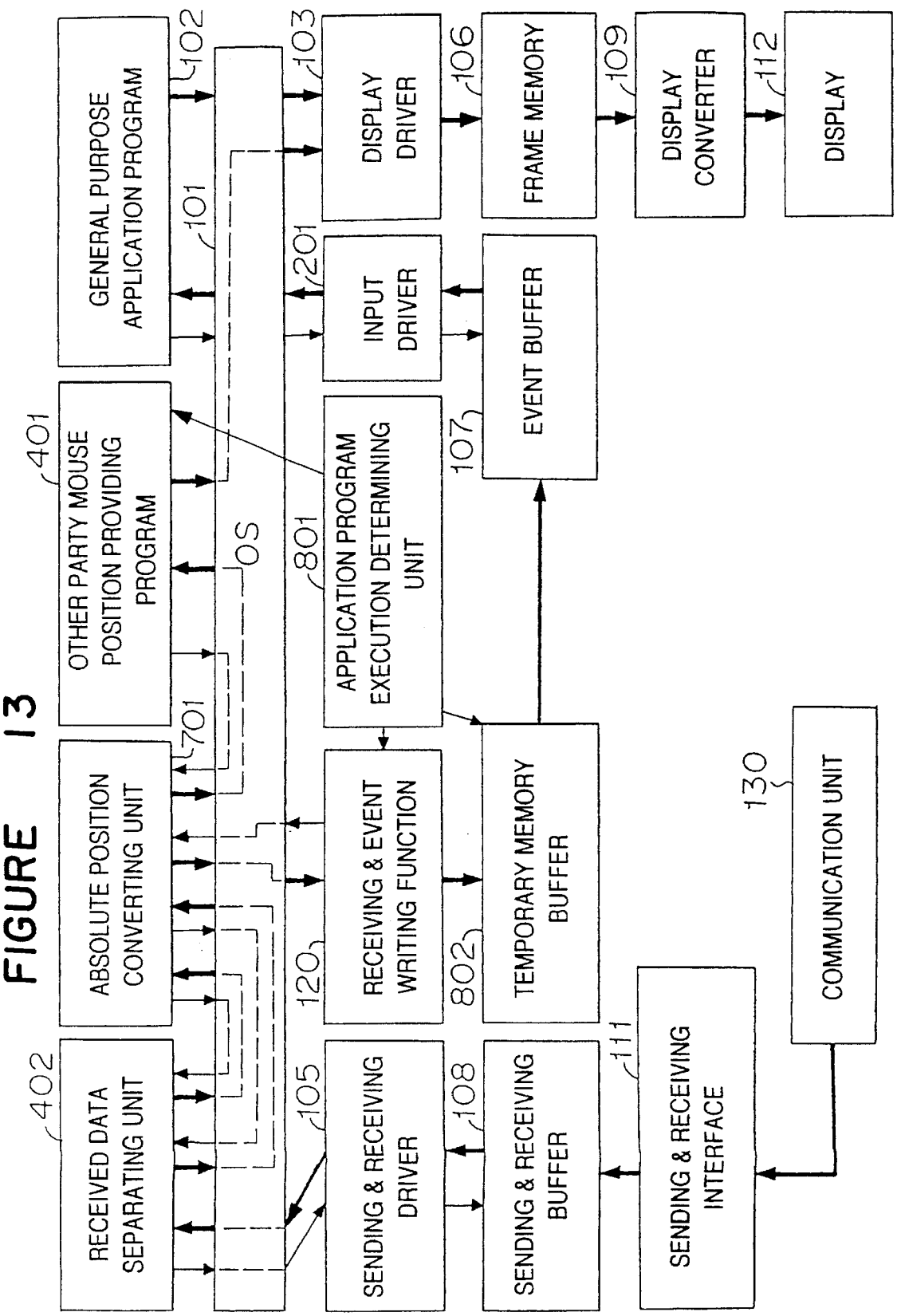
FIG. 13 is a functional block diagram showing embodiment 9 in a remote groupware operation system according to the present invention.

FIG. 13 is a functional block diagram on the receiving side showing a remote groupware operation system according to this embodiment. In FIG. 13, a reference numeral 101 designates the OS, 102, the general purpose application program, 103, the display driver, 105, the sending and receiving driver, 106, the frame memory, 107, the event buffer, 108, the sending and receiving buffer, 109, the display converter, 111, the sending and receiving interface, 112, the display, 120, the receiving and event writing function, 130, the communication unit, 201, the input driver, 401, the other party mouse position information providing program, 402, the received data separating unit and 701, the absolute position converting unit.

Next, an an explanation will be given of the operation with respect to the remote groupware operation system in accordance with the embodiment, in reference to FIG. 13. Since the receiving operation and the displaying operation are the same as in the above Examples, an explanation will be given of only portions concerning this embodiment. An application program execution determining unit 801 in accordance with this embodiment determines whether the current state of the PC is executing the application program in the groupware window. There is a case wherein an operator of the PC is executing the other application program in use of an area other than the groupware window. Hereinafter, this is described as "local operation".

The other party mouse position providing program 401 which has received the mouse position information, orders display of a pointer (cursor) based on the mouse position information to the display driver 103 when the application program execution determining unit 801 instructs that the application program is being executed in the groupware window, and abandons the received data in the other case (that is, the local operation is being executed). That is to say, the other party mouse position providing program 401 abandons the mouse position information. The reason why the other party mouse position providing program 401 abandons the mouse position information as stated above, is that it is not necessary to display the pointer (cursor) showing the mouse position information in the groupware window when the other application program is being executed. In this way, the movement of the pointer (cursor) showing the mouse position is not displayed. Since the display of the movement of the pointer (cursor) is not indispensable in performing the groupware operation, the display of the movement of the pointer (cursor) may be dispensed with when the other application program is being executed.

On the other hand, when the device receives the event data, the received event data should not be abandoned to achieve the groupware operation.

The receiving and event writing function 120 which has received the event data, stores the event data in a temporary memory buffer 802. When the window program execution determining unit 801 instructs that the application program in the groupware window is being executed, the operation reads all the data from the temporary memory buffer 802 immediately and sends the data to the event buffer 107. In other case (that is, the local operation is being executed) the operation only stores the event data in the temporary memory buffer 802 and does not execute the reading. Thereafter, when the window program execution determining unit 801 instructs that the application program in the groupware window is being executed, the operation immediately reads all the data from the temporary memory buffer 802 and sent them to the event buffer 107. Therefore, the data which has been received in executing the other application program is guaranteed to be provided to the application program through the event buffer thereby performing the groupware operation.

Example 10

Figure 14:
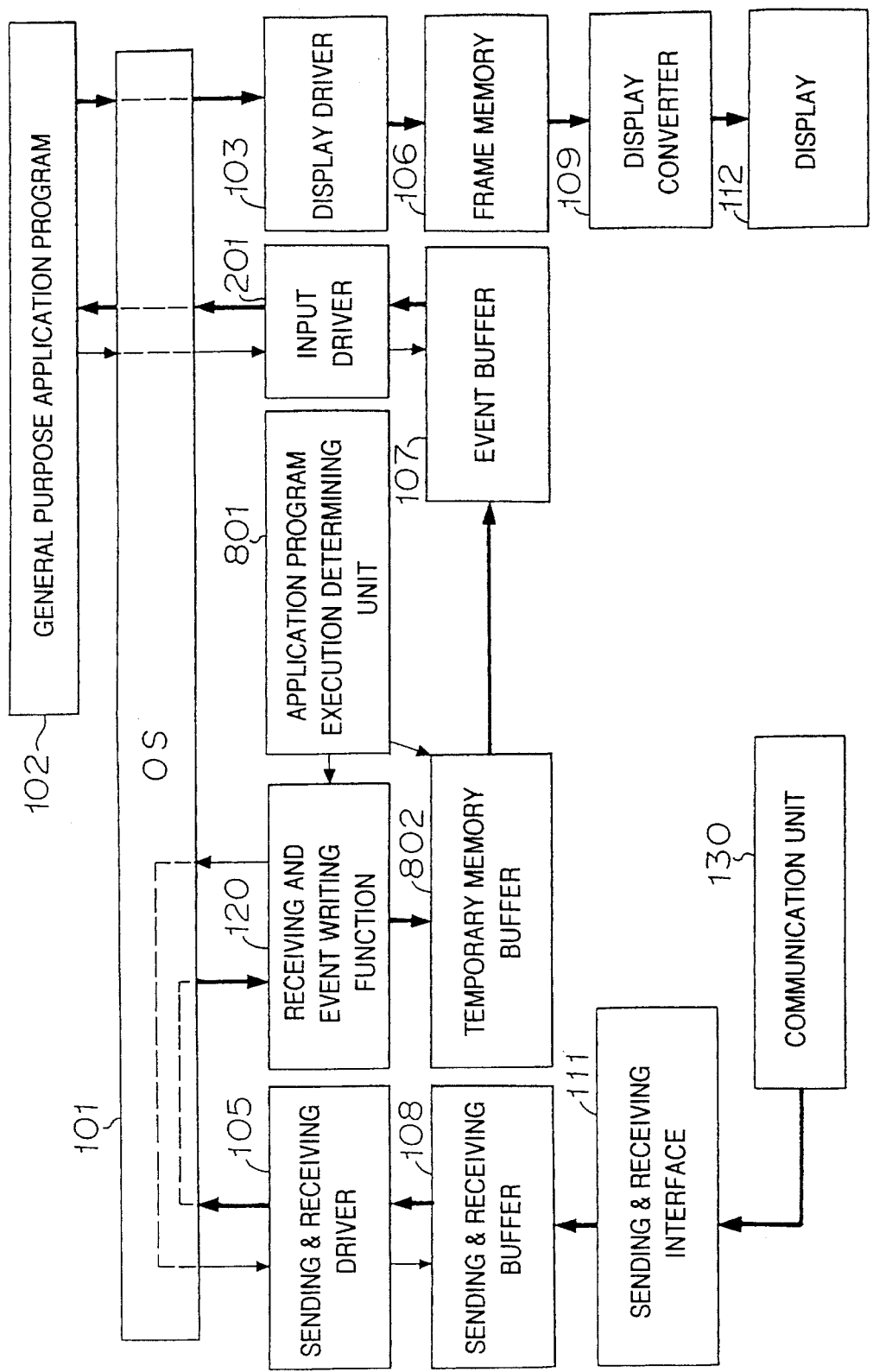
FIG. 14 is a functional block diagram showing embodiment 10 in a remote groupware operation system according to the present invention.

The above Example 9 has been described wherein the functions of Example 2 and Example 7 have been included. However, it is possible to propose a construction wherein the functions of Example 2 and Example 7 are eliminated. FIG. 14 is a diagram showing a construction wherein the functions of Example 2 and Example 7 are eliminated. In this construction, the event information is temporarily memorized while the local operation is being executed. The event information is written in the event buffer at a time point wherein the local operation has finished.

Example 11

Figure 15:
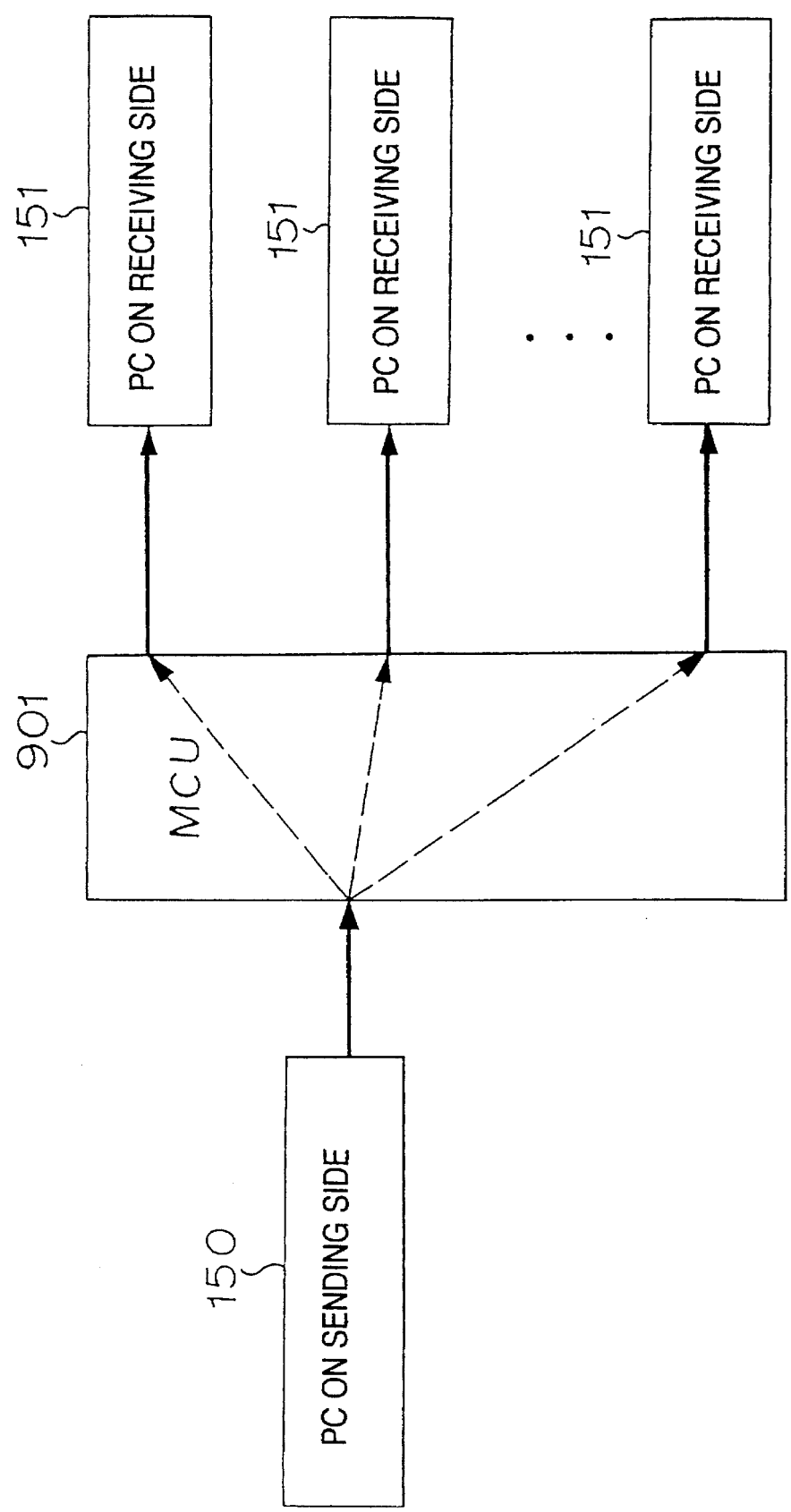
FIG. 15 is a functional block diagram showing embodiment 11 in a remote groupware operation system according to the present invention.

FIG. 15 is a functional block diagram showing a remote groupware operation system of this embodiment. In FIG. 15, a reference numeral 150 designates a PC on the sending side, 151, PCs on the receiving side and 901, an MCU (multipoint control unit).

Next, an explanation will be given of the operation of the remote groupware operation system of this embodiment in reference to FIG. 15. Instead of connecting the PC 150 on the sending side and the PC 151 on the receiving side by the communication means 130 in one-to-one connection, the MCU 901 is installed between the PC 150 on the sending side and the PCs 151 on the receiving side as shown in FIG. 15. The MCU performs copying of data and distribution thereof. The data such as the event data or the mouse position information from the PC 150 on the sending side are distributed to a plurality of PCs 151 on the receiving side, thereby enabling a real time groupware operation at remote multipoints.

As stated above, in this embodiment, a communication port of a PC provided with one or a plurality of functions of the above Examples 1 through 10 is connected to the MCU or the multipoint control unit, directly or through a network, and the MCU receives data from the PC on the sending side, copies the received data and sends the received data to the PCs other than the PC on the sending side connected to the MCU.

Example 12

Figure 16:
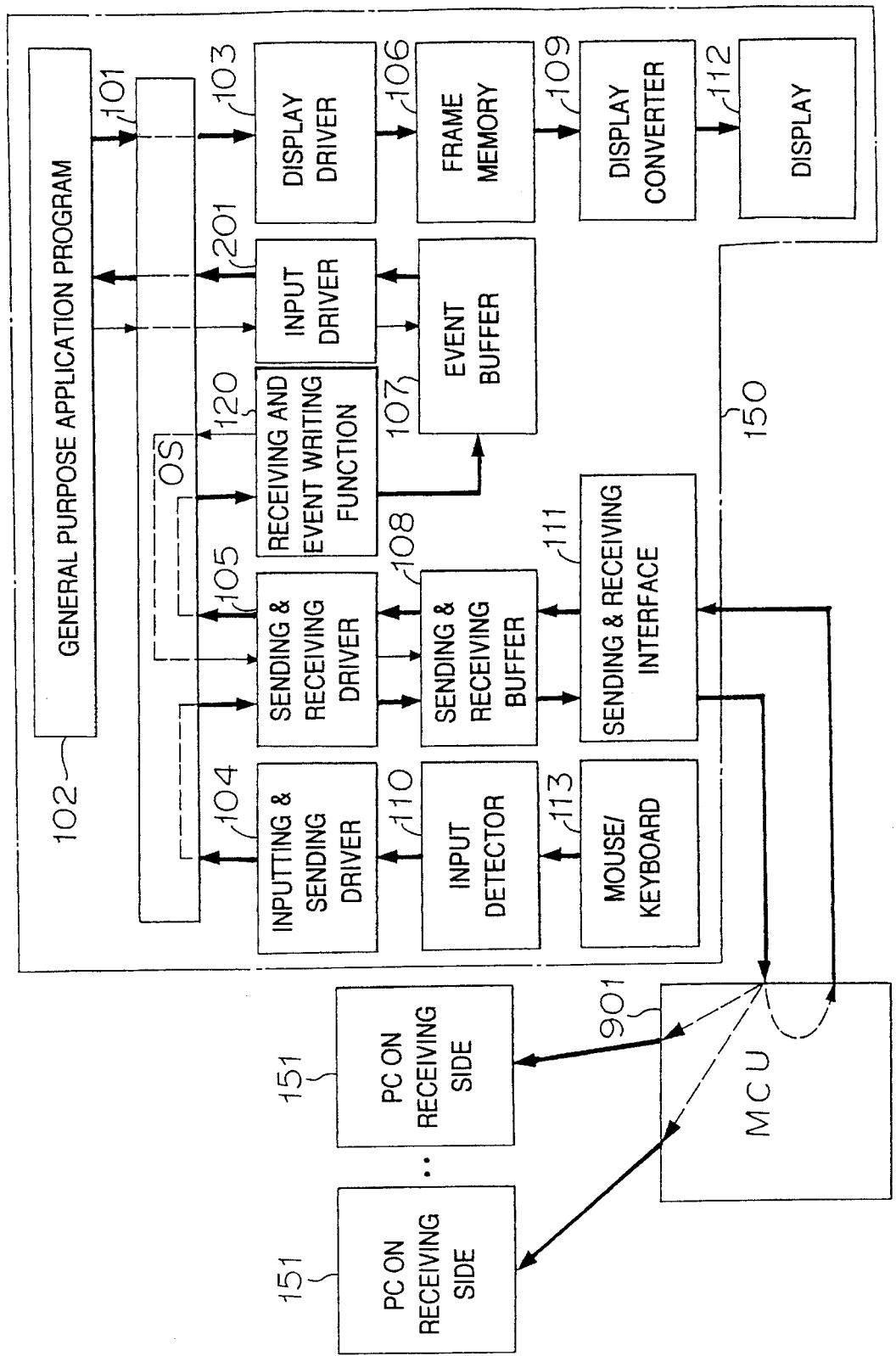
FIG. 16 is a functional block diagram showing embodiment 12 in a remote groupware operation system according to the present invention.
Figure 17:
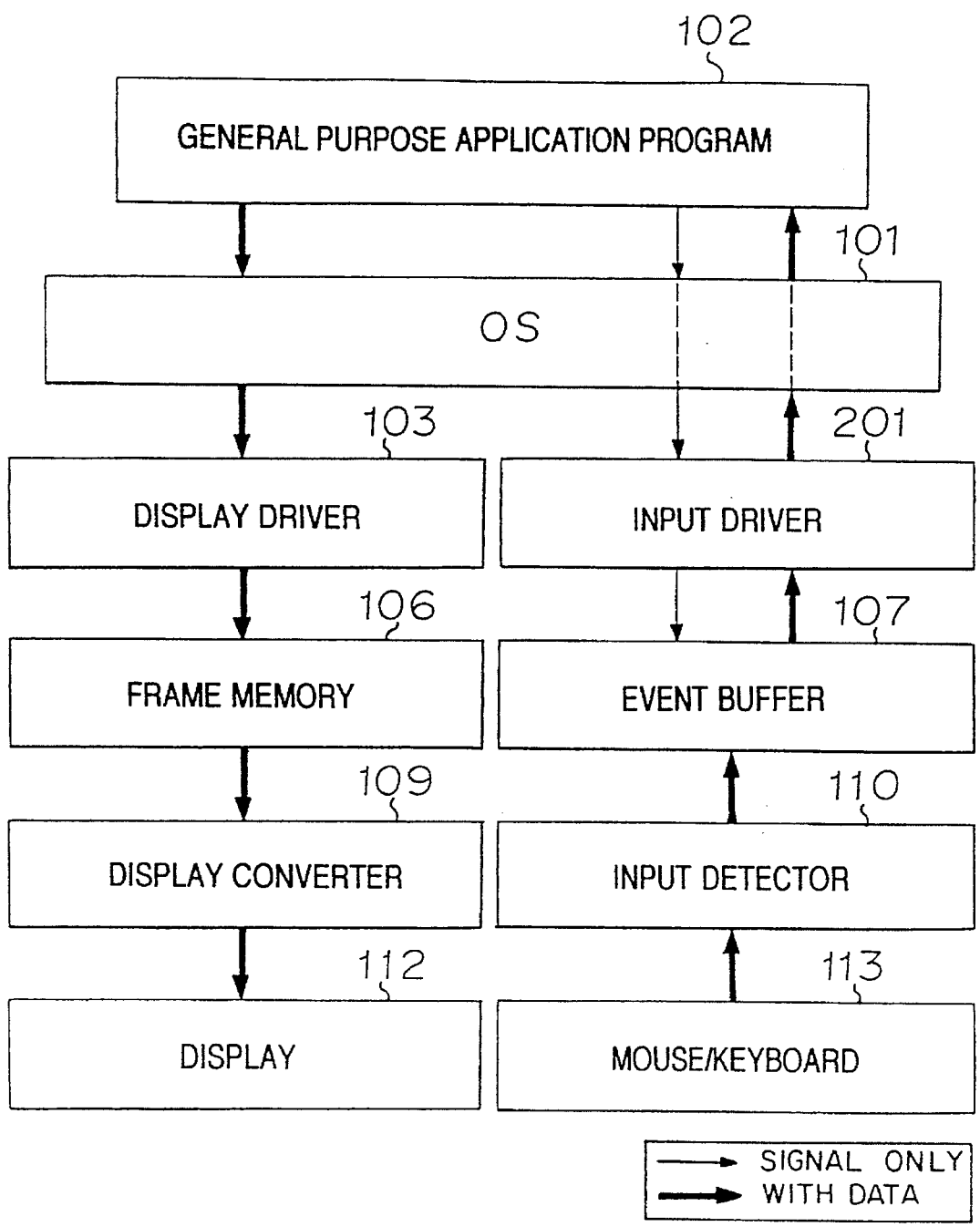
FIG. 17 is a diagram showing a general execution mode of a general purpose application program in a PC.
Figure 18:
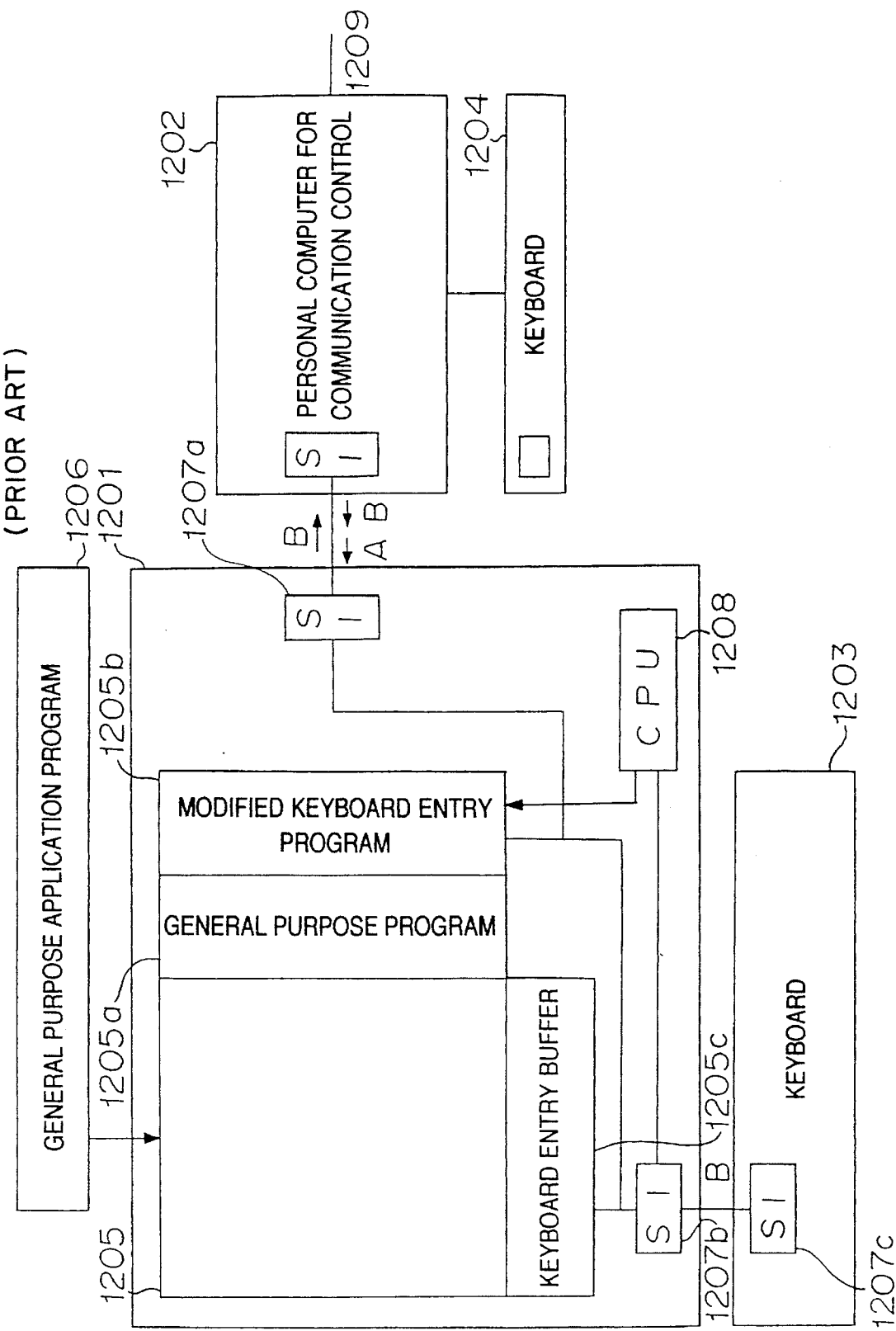
FIG. 18 is a functional block diagram showing a conventional groupware operation system shown in Japanese Unexamined Patent Publication No. 174436/1990.

FIG. 16 is a functional block diagram showing a remote groupware operation system of this embodiment. In FIG. 16, a reference numeral 101 designates the OS, 102, the general purpose application program, 103, the display driver, 104, the inputting and sending driver, 105, the sending and receiving driver, 106, the frame memory, 107, the event buffer, 108, the sending and receiving buffer, 109, the display converter, 110, the input detector, 111, the sending and receiving interface, 112, the display, 113, the mouse/keyboard, 120, the receiving and event writing function, 150, the PC on the sending side, 151, the PC on the receiving side, 201, the input driver and 901, the MCU.

Next, an explanation will be given of the operation of the remote groupware operation system of this embodiment in reference to FIG. 16. In FIG. 16, the event data are inputted from the mouse/keyboard 113. The event data which has entered the sending and receiving driver 105, is sent to the MCU 901 through the sending and receiving buffer 108 and the sending and receiving interface 111. At this moment, the sending and receiving driver 105 does not send the event data to the general purpose application program 102.

The MCU 901 copies the received data and distributes the received data to the PCs 151 on the receiving side and also distributes them to the PC 150 on the sending side. In the PC 150 on the sending side which has received the event data, the event data are written to the event buffer 107 by the receiving and event writing function 120 through the sending and receiving interface 111, the sending and receiving buffer 108 and the sending and receiving driver 105. The operation thereafter is the same as in Example 1 and its explanation will be omitted.

Accordingly, the PC on the sending side can easily be changed only by changing the distribution method of the data by the MCU 901, irrespective of whether the PCs connected to the MCU 901 are on the sending side or on the receiving side.

Example 13

It is possible to display a pointer on an image plane which is simply a mouse position of the PC on the sending side in the above Examples. However, when the multipoint connection is performed by the MCU, an information from the sending side may be added to the pointer information from the MCU, a name of a sender may be displayed to the displayed pointer and a plurality of pointers may be displayed in correspondence with the senders.

Example 14

In the above Examples, the explanation has been given wherein the PC on the sending side and the PCs on the receiving side are divided for the sake of simplicity. However, the PCs may be provided with the both functions with the same effect as in the above Examples.

Example 15

Cases have been shown in the above Examples wherein the coordinate position has been inputted by employing the mouse device. However, a coordinate input device such as a tablet, a joy stick, a line pen or the like may be employed for inputting the coordinate position with the same effect as in the above Examples.

As stated above, according to the present invention, the input event data at the device on the sending side is sent without modification of the general purpose application program, the general purpose application program in the device on the receiving side which has received the event data recognizes the event data as if they were its own input, and the distribution by the MCU is made possible. Therefore, this invention provides an effect wherein the multipoint remote groupware operation by the general purpose application program can easily be achieved.

I claim:

1. A first device for communicating with a second device in a remote groupware operation, the first device comprising:

sending means for sending data to the second device;

program operating means for operating a program;

inputting means for inputting input data to said program operated by said program operating means, and for inputting coordinate position data from a coordinate inputting device;

interface means disposed between the program operating means and said inputting means for providing the program operated by the program operating means with said input data and for providing said sending means with the input data and the coordinate position data for transmission to the second device;

coordinate position detecting means for detecting said coordinate position data from the coordinate inputting device, superposing means, disposed between the inputting and sending means, for superposing the coordinate position data on the input data to create superposed information, and for outputting the superposed information to the sending means for transmission to the second device.

2. The first device according to claim 1, wherein the program operating means includes means for operating a plurality of programs, the first device further comprising:

determining means, disposed between the interface means and the sending means, for determining a program executing a remote groupware operation among said plurality of programs operated by the program operating means, and providing the sending means only with data of the input data related to said program executing the remote groupware operation.

3. The first device according to claim 2, further comprising a relative position converting unit constructed and arranged to convert absolute position information contained in the input data into relative position information.

4. The first device of claim 1 further comprising:

receiving means for receiving data from sources external to the first device; and a second inputting means for inputting the data received by said receiving means to said program operated by said operating means.

5. The first device of claim 4 in combination with a multipoint control unit, and a second device, said multipoint control unit being disposed between the first device and the second device, the multipoint control unit receiving data from the first device and sending data to the first device and to the second device.

6. The first device of claim 1, in combination with a multipoint control unit, and a plurality of second devices, said multipoint control unit being disposed between the first device and the plurality of second devices, said multipoint control unit receiving data from the first device and sending the data to said plurality of second devices.

7. The first device according to claim 1, further comprising: a relative position converting means for converting absolute position information contained in the input data into relative position information.

8. A first device for communicating with a second device operating a second computer program employed in a remote groupware operation, the first device comprising:

receiving means for receiving input data from the second device;

program operating means for operating a first computer program, the first computer program being substantially the same as the second computer program operating on said second device;

inputting means for providing said first computer program operated by said program operating means with said input data received by said receiving means;

separating means, disposed between the receiving means and the inputting means, for separating coordinate position information from the input data received by the receiving means; and displaying means for displaying a coordinate position based on said coordinate position information separated by said separating means.

9. The first device according to claim 8, wherein the program operating means includes means for operating a plurality of programs, the first device further comprising:

determining means for determining an operational state of a program executing a remote groupware operation among said plurality of programs operated by the program operating means and for retaining the input data based on said operational state.

10. The first device according to claim 9, further comprising an absolute position converting unit constructed and arranged to convert relative position information contained in the input data into absolute position information.

11. The first device according to claim 8, further comprising:

absolute position converting means for converting relative position information contained in the input data into absolute position information.

12. A first device for communicating with a second device in a remote groupware operation, the first device comprising:

a sending unit constructed and arranged to send data to the second device;

an operating system constructed and arranged to operate a plurality of programs;

an input unit constructed and arranged to input data to one of the plurality of programs;

an interface unit, disposed between the operating system and the input unit, constructed and arranged to provide the one of the plurality of programs with the input data and provide the sending unit with the input data; and a determining unit, disposed between the interface unit and the sending unit, constructed and arranged to determine a program executing a remote groupware operation among the plurality of programs and provide the sending unit only with data of the input data related to the program.

13. The first device of claim 12, further comprising a relative position converting unit constructed and arranged to convert absolute position information contained in the input data into relative position information.

14. The first device of claim 12, further comprising:

a receiving unit constructed and arranged to receive data from sources external to the first device;

a second input unit constructed and arranged to input the data received by the receiving unit to said program operated by said operating system.

15. The first device of claim 12, in combination with a multipoint control unit, and a second device, the multipoint control unit being disposed between the first device and the second device, the multipoint control unit receiving data from the first device and sending data to the first device and to the second device.

16. A first device for communicating with a second device operating a second computer program in a remote groupware operation, the first device comprising:

a receiving unit constructed and arranged to receive input data from the second device:

an operating system constructed and arranged to operate a plurality of programs, the plurality of programs including a first computer program that is substantially the same as the second computer program operating on the second device;

an input unit constructed and arranged to input said first program operated by said operating system with said input data received by said receiving unit; and a determining unit constructed and arranged to determine an operational state of the first program and retain portions of the input data based on said operational state and delete portions of the input data based on said operational state.

17. The first device according to claim 16, further comprising:

an absolute position converting unit constructed and arranged to convert relative position information contained in the input data into absolute position information.

18. A first device for communicating with a second device in a remote groupware operation, the first device comprising:

a sending unit constructed and arranged to send data to the second device;

an operating system constructed and arranged to operate a plurality of programs;

an input unit constructed and arranged to input data to one of the plurality of programs;

an interface unit, disposed between the operating system and the input unit, constructed and arranged to provide the one of the plurality of programs with the input data and provide said sending unit with the input data; and a relative position converting unit constructed and arranged to convert absolute position information contained in the input data into relative position information.

19. The first device of claim 18, further comprising:

a receiving unit constructed and arranged to receive data from sources external to the first device;

a second input unit constructed and arranged to input the data received by the receiving unit to said program operated by said operating system.

20. The first device of claim 18, in combination with a multipoint control unit, and a second device, said multipoint control unit being disposed between the first device and the second device, the multipoint control unit receiving data from the first device and sending data to the first device and to the second device.

21. A first device for communicating with a second device operating a second computer program in a remote groupware operation, the first device comprising:

a receiving unit constructed and arranged to receive input data from the second device;

an operating system constructed and arranged to operate a plurality of programs, the plurality of computer programs including a first computer program that is substantially the same as the second computer program operating on the second device;

an input unit constructed and arranged to provide said first program operated by said operating system with said input data received by said receiving unit; and an absolute position converting unit constructed and arranged to convert relative position information contained in the input data into absolute position information.

22. A method of sharing input data between a first computer and a second computer in a remote groupware operation, wherein each of the first and the second computers has an operating system that operates a plurality of computer programs including a computer program in a remote groupware operation, the method comprising the steps of:

receiving input data from an input device for one of the plurality of computer programs in the first computer;

providing the input data to the one of the plurality of computer programs in the first computer;

determining if the one of the plurality of computer programs is the computer program in the remote groupware operation; and sending the input data to the second computer when the one of the plurality of computer programs is the computer program in remote groupware operation.

23. The method of claim 22 further comprising steps of:

receiving the input data from the first computer in the second computer;

determining whether a current operating state of the second computer is with respect to the computer program in remote groupware operation; and storing the input data in a buffer when the current operating state of the second computer is not with respect to the computer program in remote groupware operation.

24. The method of claim 23 wherein the input data includes curser position information and event information, and wherein the step of storing includes a step of discarding the curser position information when the current operating state of the second computer is not with respect to the computer program in remote groupware operation.

* * * * *